US012650569B2

(12) United States Patent
Parris et al.

(10) Patent No.: US 12,650,569 B2
(45) Date of Patent: Jun. 9, 2026

(54) OPTICAL-FIBER RIBBON

(71) Applicant: Prysmian S.p.A., Milan (IT)

(72) Inventors: Donald Ray Parris, Lexington, SC (US); Jeffrey Scott Barker, Stony Point, NC (US)

(73) Assignee: Prysmian S.p.A., Milan (IT)

( * ) Notice: Subject to any disclaimer, the term of this patent is extended or adjusted under 35 U.S.C. 154(b) by 265 days.

(21) Appl. No.: 18/388,228

(22) Filed: Nov. 9, 2023

(65) Prior Publication Data

US 2025/0155662 A1 May 15, 2025

(51) Int. Cl.
G02B 6/44 (2006.01)

(52) U.S. Cl.
CPC .................................... G02B 6/448 (2013.01)

(58) Field of Classification Search
CPC ...................................................... G02B 6/448
USPC .......................................................... 385/114
See application file for complete search history.

(56) References Cited

U.S. PATENT DOCUMENTS

| | | | |
|---|---|---|---|
| 7,623,747 B2 | 11/2009 | de Montmorillon et al. |
| 7,702,204 B2 | 4/2010 | Gonnet et al. |
| 7,889,960 B2 | 2/2011 | de Montmorillon et al. |
| 7,995,889 B2 | 8/2011 | de Montmorillon et al. |
| 8,131,125 B2 | 3/2012 | de Montmorillon et al. |
| 8,145,025 B2 | 3/2012 | de Montmorillon et al. |
| 8,265,440 B2 | 9/2012 | Gonnet et al. |
| 8,265,442 B2 | 9/2012 | Overton |

| | | | |
|---|---|---|---|
| 8,428,414 B2 | 4/2013 | de Montmorillon et al. |
| 8,600,206 B2 | 12/2013 | Overton |
| 8,837,889 B2 | 9/2014 | de Montmorillon et al. |
| 9,244,220 B2 | 1/2016 | Overton |
| 9,995,896 B2 | 6/2018 | Namazue et al. |
| 10,185,105 B2 | 1/2019 | Risch et al. |
| 10,782,495 B2 | 9/2020 | Fallahmohammadi et al. |
| 10,884,213 B1 | 1/2021 | Fallahmohammadi et al. |
| 10,983,297 B2 | 4/2021 | Fallahmohammadi et al. |
| 11,169,342 B2 | 11/2021 | Fallahmohammadi et al. |
| 11,256,051 B2 | 2/2022 | Fallahmohammadi et al. |
| 11,442,238 B2 | 9/2022 | Fallahmohammadi et al. |
| 11,460,652 B2 | 10/2022 | Fallahmohammadi et al. |
| 11,500,171 B2 | 11/2022 | Fallahmohammadi et al. |
| 11,656,417 B2 | 5/2023 | Fallahmohammadi et al. |
| 11,860,429 B2 | 1/2024 | Fallahmohammadi et al. |
| 2022/0196944 A1 * | 6/2022 | Fallahmohammadi ..................... G02B 6/441 |
| 2022/0269023 A1 | 8/2022 | Kaneko et al. |
| 2022/0317399 A1 * | 10/2022 | Murakoshi .......... G02B 6/4403 |
| 2023/0013589 A1 | 1/2023 | Fallahmohammadi et al. |
| 2023/0266549 A1 | 8/2023 | Fallahmohammadi et al. |

FOREIGN PATENT DOCUMENTS

| | | |
|---|---|---|
| WO | 2010/053356 A2 | 5/2010 |
| WO | 2018/022031 A1 | 2/2018 |
| WO | 2022/0108795 A1 | 5/2022 |

* cited by examiner

*Primary Examiner* — Jerry M Blevins

(74) *Attorney, Agent, or Firm* — Additon, Pendleton & Witherspoon, P.A.

(57) ABSTRACT

A method of producing an optical-fiber ribbon includes applying bonding material to an expanded optical-fiber assembly and thereafter closing the spacing between the respective optical fibers in the expanded longitudinal optical-fiber assembly to achieve a contracted longitudinal optical-fiber assembly. The method achieves an optical-fiber ribbon having excellent flexibility, strength, and robustness.

22 Claims, 18 Drawing Sheets

FIG. 11A          FIG. 11B

OPTICAL-FIBER RIBBON

FIELD OF THE INVENTION

The present invention relates to optical-fiber ribbons and methods for producing optical-fiber ribbons.

BACKGROUND

Optical fibers provide advantages over conventional communication lines. As compared with traditional wire-based networks, optical-fiber communication networks can transmit significantly more information at significantly higher speeds. The amount of data transmitted over optical-fiber cables is continuously increasing worldwide. This is especially so in data centers because of the expansion of cloud computing, which requires that data be received and transmitted in limited physical space. As such, there is an increasing demand for high-fiber-count and high-fiber-density optical cables. Moreover, there is persistent desire to reduce construction costs of access cable networks, making the reduction of optical-cable diameter and weight central to the use of existing facilities (e.g., underground ducts) to reduce installation costs. Another practical requirement is the ability to mass-fusion splice optical fibers to shorten the time required for connecting cables. This means that there are several—possibly conflicting—demands, such as decreasing optical-cable diameters, increasing optical-fiber density, and improving optical-cable workability. This is a serious and difficult challenge for optical-cable manufacturers.

To achieve easy workability, optical-fiber ribbons can preferentially be mass-fusion spliced to simultaneously make multiple optical-fiber connections. Conventional optical-fiber ribbons have the disadvantage of rigidity, however, because of the application of a resin layer around the optical-fiber assembly to keep the optical fibers in a parallel plane. This rigidity limits the possibility of increasing fiber density in optical-fiber cables.

SUMMARY

Accordingly, in one aspect, the present invention embraces methods of making optical-fiber ribbons.

An exemplary method of making an optical-fiber ribbon includes (i) arranging a plurality n of optical fibers into an expanded longitudinal optical-fiber assembly having processing width $w_p$ extending crosswise to a longitudinal length of the expanded optical-fiber assembly, wherein the plurality of optical fibers are substantially parallel and wherein at least some of the plurality of optical fibers are respectively spaced apart from one another, thereby defining respective gaps between at least some adjacent optical fibers; (ii) advancing the expanded longitudinal optical-fiber assembly at linear velocity v; (iii) applying bonding material to a surface of the expanded optical-fiber assembly via a dispenser; and (iv) thereafter closing the spacing (e.g., the respective gaps) between the respective optical fibers in the expanded longitudinal optical-fiber assembly to achieve a contracted longitudinal optical-fiber assembly having planar width w extending crosswise to a longitudinal length of the contracted optical-fiber assembly, whereby processing width $w_p$>planar width w.

In an exemplary embodiment, the method includes applying (e.g., either continuously or intermittently) bonding material to a surface of the expanded optical-fiber assembly via the dispenser while the dispenser revolves around a central axis that is centrally positioned to substantially intersect the expanded optical-fiber assembly's midline ($w_p$/2). The dispenser applies bonding material to each optical fiber in the expanded optical-fiber assembly, which typically includes two outermost optical fibers having diameter d. For example, the dispenser typically revolves around the central axis in a circular orbit having a diameter inclusively between (i) the lateral distance between the two outermost optical fibers ($w_p$−2d) and (ii) the processing width $w_p$ of the expanded optical-fiber assembly.

In another exemplary embodiment, the method includes applying (e.g., either continuously or intermittently via the dispenser) bonding material to each optical fiber in the expanded optical-fiber assembly, which, as noted, typically includes two outermost optical fibers having diameter d. For example, the dispenser repeatedly moves across the expanded optical-fiber assembly inclusively between (i) the lateral distance between the two outermost optical fibers ($w_p$−2d) and (ii) the processing width $w_p$ of the expanded optical-fiber assembly. For example, the dispenser might reciprocate across the expanded optical-fiber assembly, or the dispenser might revolve around a central axis with a cyclical frequency r.

In another exemplary embodiment, the dispenser repeatedly moves an amplitude $A_d$ measured crosswise to the longitudinal length of the expanded optical-fiber assembly, wherein the dispenser's amplitude $A_d$ exceeds the expanded optical-fiber assembly's processing width $w_p$, whereby amplitude $A_d$>processing width $w_p$. In other words, the dispenser "overshoots" the processing width $w_p$ of the expanded optical-fiber assembly. Typically, the dispenser repeatedly moves across the processing width $w_p$ of the expanded optical-fiber assembly beyond both a first outermost optical fiber in the expanded optical-fiber assembly and an opposite second outermost optical fiber in the expanded optical-fiber assembly to apply bonding material to each optical fiber in the expanded optical-fiber assembly. For example, the dispenser might reciprocate at amplitude $A_d$ across the expanded optical-fiber assembly's processing width $w_p$, or the dispenser might revolve around a central axis at amplitude $A_d$ with a cyclical frequency r.

Another exemplary method of making an optical-fiber ribbon includes (i) arranging a plurality n of optical fibers into an expanded longitudinal optical-fiber assembly having processing width $w_p$, a first major surface, and a second major surface, wherein the plurality of optical fibers are substantially parallel and wherein at least some (e.g., most, if not all) of the plurality of optical fibers are respectively spaced apart from one another, thereby defining respective gaps between at least some adjacent optical fibers; (ii) continuously advancing the plurality of spaced optical fibers as arranged in the expanded longitudinal optical-fiber assembly at linear velocity v; (iii) applying bonding material to the first major surface of the expanded longitudinal optical-fiber assembly via a dispensing nozzle; (iv) passing at least some bonding material from the expanded longitudinal optical-fiber assembly's first major surface toward the expanded longitudinal optical-fiber assembly's second major surface, the bonding material passing between the respective gaps between adjacent, spaced optical fibers; and (v) closing the respective gaps between adjacent, spaced optical fibers in the expanded longitudinal optical-fiber assembly to achieve a contracted longitudinal optical-fiber assembly having planar width w, whereby processing width $w_p$>planar width w. The bonding material on the longitudinal optical-fiber assembly's first and second major surfaces adhesively bonds adjacent optical fibers in the optical-fiber assembly.

In an exemplary embodiment, the method includes applying (e.g., either continuously or intermittently via the dispensing nozzle) bonding material to a surface of the expanded optical-fiber assembly while the dispensing nozzle revolves around a central axis that is centrally positioned to substantially intersect the midline ($w_p/2$) of the expanded optical-fiber assembly, which, as noted, includes two outermost optical fibers having diameter d. For example, the dispensing nozzle typically applies bonding material to each optical fiber in the expanded optical-fiber assembly while revolving around the central axis in a circular orbit having a diameter inclusively between (i) the lateral distance between the two outermost optical fibers ($w_p-2d$) and (ii) the processing width $w_p$ of the expanded optical-fiber assembly.

In another exemplary embodiment, the method includes applying (e.g., either continuously or intermittently via the dispensing nozzle) bonding material to each optical fiber in the expanded optical-fiber assembly, which, as noted, includes two outermost optical fibers having diameter d. Here, the dispensing nozzle repeatedly moves across the expanded optical-fiber assembly inclusively between (i) the lateral distance between the two outermost optical fibers ($w_p-2d$) and (ii) the processing width $w_p$ of the expanded optical-fiber assembly.

In another exemplary embodiment, the dispensing nozzle repeatedly moves an amplitude $A_d$ across the expanded optical-fiber assembly's processing width $w_p$, wherein the dispensing nozzle's amplitude $A_d$ measured crosswise to the longitudinal length of the expanded optical-fiber assembly exceeds the expanded optical-fiber assembly's processing width $w_p$, whereby amplitude $A_d$>processing width $w_p$. In other words, the dispensing nozzle "overshoots" the processing width $w_p$ of the expanded optical-fiber assembly. Typically, the dispensing nozzle repeatedly moves across the processing width $w_p$ of the expanded optical-fiber assembly beyond both a first outermost optical fiber in the expanded optical-fiber assembly and an opposite second outermost optical fiber in the expanded optical-fiber assembly to apply bonding material to each optical fiber in the expanded optical-fiber assembly.

In another aspect, the present invention embraces optical-fiber ribbons.

An exemplary optical-fiber ribbon includes (i) a plurality n of respectively adjacent optical fibers extending in a longitudinal direction and arranged in parallel to form an optical-fiber assembly having a first major surface, a second major surface, and a width w extending crosswise to a longitudinal length of the optical-fiber assembly; and (ii) bonding material adhesively bonding adjacent optical fibers in the optical-fiber assembly, wherein, for a portion of the optical-fiber assembly's longitudinal length, the bonding material forms a primary bonding-material pattern across the optical-fiber assembly's first major surface (e.g., the upper surface) and a corresponding secondary bonding-material pattern across the optical-fiber assembly's second major surface (e.g., the lower surface). Typically, the bonding material forming the primary bonding-material pattern and the corresponding secondary bonding-material pattern incrementally bonds each adjacent pair of optical fibers in the optical-fiber assembly.

In an exemplary optical-fiber ribbon embodiment, each optical fiber has a substantially circular cross section, and all the optical fibers have substantially the same nominal diameter. Typically, along a longitudinal portion of the optical-fiber assembly (e.g., a contracted optical-fiber assembly), the optical fibers are substantially contiguous to one another, although de minimis gaps may exist between adjacent optical fibers along the optical-fiber ribbon's length. As such, the nominal width $w_r$ of the optical-fiber ribbon typically reflects the number n and diameter d of the optical fibers in the optical-fiber assembly (i.e., $w_r \approx n \times d$). That said, in some exemplary embodiments, across the width $w_r$ of the optical-fiber ribbon for a portion of its longitudinal length, the optical-fiber ribbon includes gaps between at least some of the adjacent optical fibers such that the nominal width $w_r$ of the optical-fiber ribbon exceeds the width of an otherwise comparable optical-fiber ribbon having no spacing between adjacent optical fibers by about 5-10 percent or less (e.g., $n \times d < w_r \leq 1.1 \times n \times d$, such as $n \times d < w_r \leq 1.05 \times n \times d$). Typically, the nominal width $w_r$ of the resulting optical-fiber ribbon corresponds to the width w of the contracted optical-fiber assembly (i.e., $w_r \approx w$).

In an exemplary optical-fiber ribbon embodiment, along a longitudinal portion of the optical-fiber assembly, the primary bonding-material pattern comprises either a continuous bead of bonding material or intermittent beads of bonding material (e.g., at the upper surface of the optical-fiber assembly). Typically, along the corresponding longitudinal portion of the optical-fiber assembly, the secondary bonding-material pattern respectively comprises intermittent beads of bonding material (e.g., at the lower surface of the optical-fiber assembly).

In another exemplary optical-fiber ribbon embodiment, along a longitudinal portion of the optical-fiber assembly, which typically includes two outermost optical fibers having diameter d, the primary bonding-material pattern across the optical-fiber assembly's first major surface has an amplitude substantially between (i) the lateral distance between the two outermost optical fibers ($w-2d$) and (ii) the width w of the optical-fiber assembly.

Exemplary optical-fiber ribbons have excellent flexibility, strength, and robustness to facilitate rolling or folding of the constituent optical fibers in the ribbon-width direction. Moreover, exemplary optical-fiber ribbons facilitate splitting of the optical-fiber ribbon or breakout of individual fibers without damaging the structural components (e.g., the protective optical-fiber coatings) of the optical fibers. During optical-fiber breakout there is typically no coating or ink transfer from the optical fibers to the bonding material (e.g., beads of bonding material securing the optical fibers in the optical-fiber ribbon). For example, internal failure of the bead(s) during fiber breakout ensures no damage occurs to the optical fibers.

In addition, exemplary optical-fiber ribbons can be mass-fusion spliced to make multiple optical-fiber connections, and individual optical fibers can be separated without damaging adjacent optical fibers. Each optical fiber typically includes, from its center to its periphery, a glass core, a glass cladding, and one or more coatings (e.g., a primary coating, a secondary coating, and an optional ink layer). As such, corresponding embodiments of the optical-fiber ribbon herein disclosed are applicable to the related method for making an optical-fiber ribbon, and vice versa.

The foregoing illustrative summary, other objectives and/or advantages of the present disclosure, and the manner in which the same are accomplished are further explained within the following detailed description and its accompanying drawings.

BRIEF DESCRIPTION OF THE DRAWINGS

The present invention is described hereinafter with reference to the accompanying drawings in which embodiments of the present invention are shown and in which like reference numbers indicate the same or similar elements. The drawings are provided as examples, may be schematic, and may not be drawn to scale. The present inventive aspects may be embodied in many different forms and should not be construed as limited to the examples depicted in the drawings.

DETAILED DESCRIPTION

Various aspects and features are herein described with reference to the accompanying figures. Details are set forth to provide a thorough understanding of the present disclosure. It will be apparent, however, to those having ordinary skill in the art that the disclosed optical-fiber ribbons and methods for producing optical-fiber ribbons may be practiced or performed without some or all of these specific details. As another example, features disclosed as part of one embodiment can be used in another embodiment to yield a further embodiment. Sometimes well-known aspects are not described in detail to avoid unnecessarily obscuring the present disclosure. This detailed description is thus not to be taken in a limiting sense, and it is intended that other embodiments are within the spirit and scope of the present disclosure.

In a first aspect, the invention embraces a method of producing an optical-fiber ribbon. The method facilitates faster line speeds during the manufacturing of optical-fiber ribbons while achieving optical-fiber ribbons having excellent flexibility, strength, and robustness.

Figure 1:
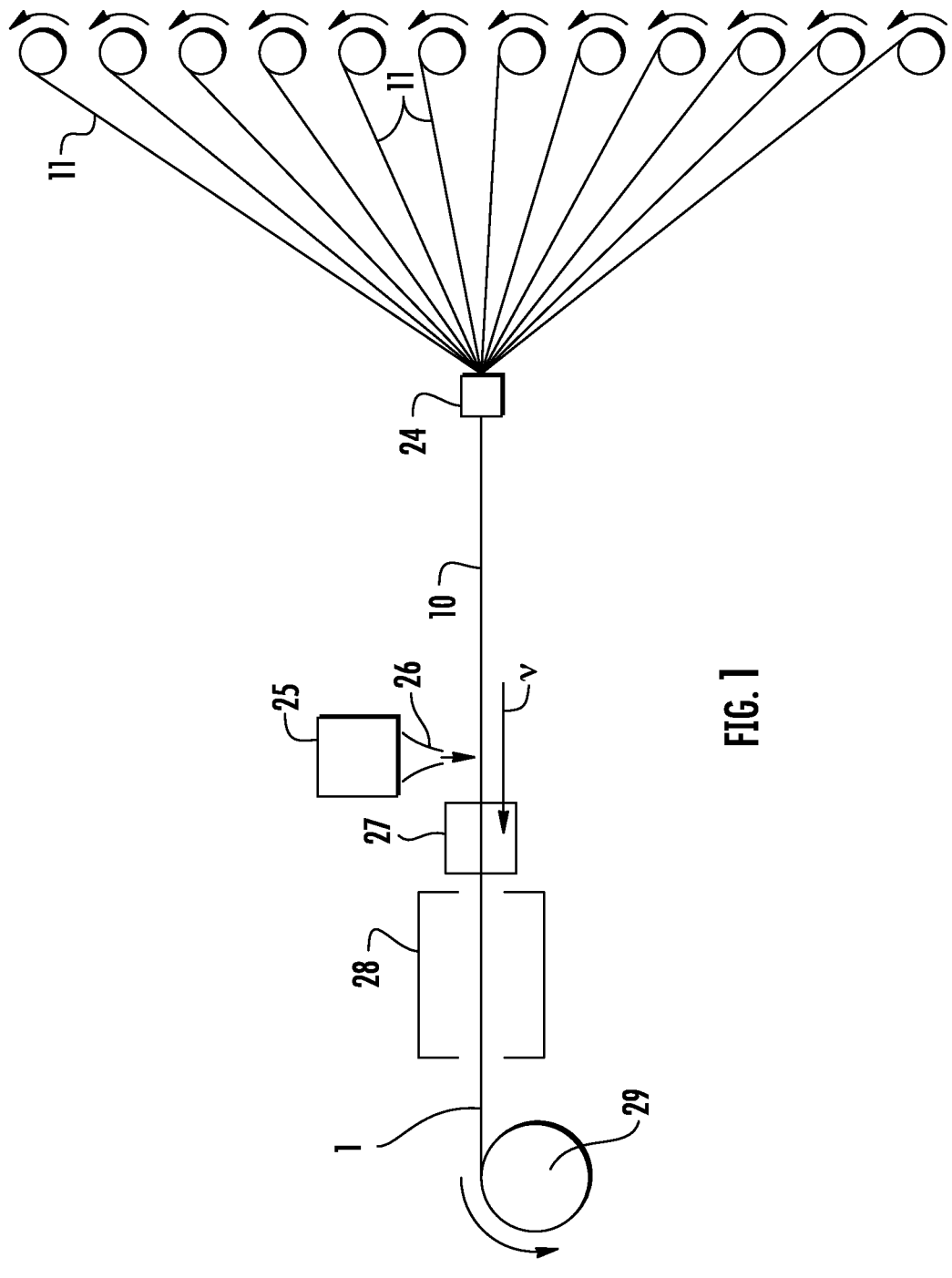
FIG. 1 depicts in a side-elevation view an exemplary method of making an optical-fiber ribbon in accordance with an embodiment of this disclosure.
Figure 2:
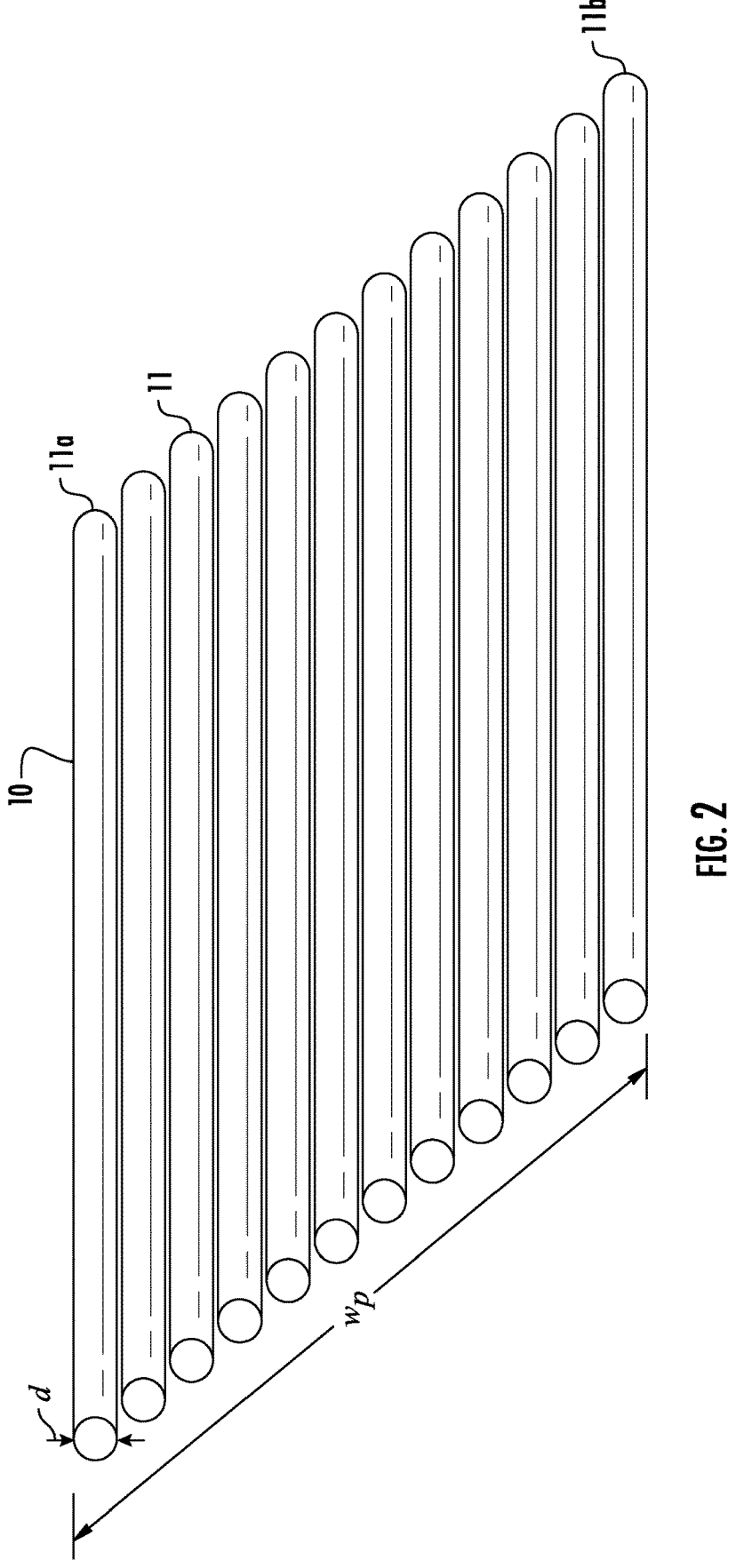
FIG. 2 depicts in a perspective view a section of an exemplary expanded longitudinal optical-fiber assembly in accordance with an embodiment of this disclosure.

As shown in the process schematic depicted in FIG. 1 (processing from right to left), a plurality n of optical fibers 11 (e.g., 12 or 24 conventional or reduced-diameter optical fibers) are arranged into an expanded longitudinal optical-fiber assembly 10 having a processing width $w_p$ extending crosswise to a longitudinal length of the optical-fiber assembly. FIG. 2 illustrates a section of an exemplary expanded longitudinal optical-fiber assembly 10 having a processing width $w_p$ in which the plurality n of optical fibers, each having a diameter d, are substantially parallel and respectively spaced apart from one another. In an exemplary method, a plurality of optical fibers 11 are introduced (e.g., fed into an aggregating die 24) to provide an expanded optical-fiber assembly 10 in which the plurality of spaced optical fibers 11 are substantially parallel and respectively adjacent to each other. Typically, the expanded optical-fiber assembly 10 is a loose arrangement of substantially parallel, spaced optical fibers with no bonding between adjacent optical fibers (e.g., respective gaps separate adjacent optical fibers). When employing an aggregating die 24 to align the spaced optical fibers, the entry speed of the loose optical fibers is the same as the exit speed of the longitudinal optical-fiber assembly.

During processing, the optical-fiber assembly 10 (e.g., an expanded longitudinal optical-fiber assembly) advances at linear velocity v, typically at a linear speed greater than 150 meters per minute (e.g., greater than 200 meters per minute, such as greater than 300 meters per minute). In some exemplary embodiments, the optical-fiber assembly 10 advances at linear velocity v between 400 and 700 meters per minute (e.g., between about 500 and 600 meters per minute).

As the expanded optical-fiber assembly 10 passes near (e.g., beneath) a dispenser 25 (e.g., a dispensing unit or similar dispensing device, such as an associated dispensing nozzle 26), bonding material (e.g., a curable adhesive or other matrix resin) is applied to the expanded optical-fiber assembly 10 to promote adhesive bonding of adjacent optical fibers 11 in the optical-fiber assembly. For example, the bonding material may be dispensed as a continuous adhesive bead (or a plurality of discontinuous beads) via a dispensing nozzle 26 to a first major surface of the optical-fiber assembly 10 (e.g., its upper surface, such as the exposed upper portion of the optical-fiber assembly). Typically, the dispenser 25 and/or the dispensing nozzle 26 apply bonding material to each optical fiber 11 in the expanded optical-fiber assembly 10—and into the respective gaps between adjacent optical fibers—to facilitate bonding of the optical-fibers 11 into an optical-fiber ribbon.

By way of non-limiting example, during processing (e.g., when the bonding material is applied to the expanded optical-fiber assembly), the respective gaps between adjacent optical fibers in the expanded optical-fiber assembly are typically less than the corresponding optical-fiber diameter d, more typically between about 10 percent and 90 percent of the corresponding optical-fiber diameter d. In exemplary embodiments of the expanded optical-fiber assembly, the respective gaps between adjacent optical fibers in the expanded optical-fiber assembly are between about 20 percent and 80 percent of the corresponding optical-fiber diameter d, such as between about 30 percent and 70 percent of the corresponding optical-fiber diameter d. In other exemplary embodiments of the expanded optical-fiber assembly, the respective gaps between adjacent optical fibers in the expanded optical-fiber assembly are between about 40 percent and 60 percent of the corresponding optical-fiber diameter d, such as between about 45 percent and 55 percent (e.g., about 50 percent) of the corresponding optical-fiber diameter d. See e.g., FIGS. 2, 3, 5, and 7A-7C.

In some process embodiments, the movement of the dispenser 25 and/or the dispensing nozzle 26 substantially corresponds to the expanded optical-fiber assembly's processing width $w_p$, which extends crosswise to the longitudinal length of the optical-fiber assembly. For example, the dispenser 25 and/or the dispensing nozzle 26 repeatedly move across the expanded optical-fiber assembly inclusively between (i) the lateral distance between the two outermost optical fibers ($w_p$−2d) and (ii) the processing width $w_p$ of the expanded optical-fiber assembly. Stated otherwise, the dispenser's lateral amplitude (e.g., side-to-side) reaches the outermost, opposite optical fibers in the optical-fiber assembly, such as extending to the opposite edge portions of the expanded optical-fiber assembly.

In other process embodiments, the dispenser 25 and/or the dispensing nozzle 26 repeatedly move an amplitude $A_d$ measured crosswise to the longitudinal length of the optical-fiber assembly such that the dispenser's amplitude $A_d$ exceeds the expanded optical-fiber assembly's processing width $w_p$ (e.g., an "overshooting" technique).

Typically, at least some bonding material from the expanded longitudinal optical-fiber assembly's first major surface (e.g., its upper surface, such as the exposed upper portion of the optical-fiber assembly above its elevational centerline) passes toward the expanded longitudinal optical-fiber assembly's second major surface (e.g., its lower surface, such as the exposed lower portion of the optical-fiber assembly below its elevational centerline) via gaps between adjacent, spaced optical fibers. For example, during processing, the bonding material passes between the respective gaps between adjacent, spaced optical fibers (e.g., the adjacent optical fibers in an "open configuration"). For example, bonding material passes, migrates, or otherwise moves from an upper portion of the optical-fiber assembly (e.g., its top half, such as above the optical-fiber assembly's elevational centerline) to a lower portion of the expanded optical-fiber assembly (e.g., its bottom half, such as below the optical-fiber assembly's elevational centerline).

Thereafter (or perhaps concurrently), as shown in the process schematic depicted in FIG. 1, the spacing (e.g., the respective gaps) between the respective optical fibers in the expanded optical-fiber assembly is closed, such as via a closing die 27 (e.g., a contracting guideway), to achieve a contracted optical-fiber assembly having planar width w extending crosswise to a longitudinal length of the contracted optical-fiber assembly. For example, the contraction of the expanded optical-fiber assembly may encourage the passing of bonding material from the upper portion of the optical-fiber assembly to the lower portion of the optical-fiber assembly (e.g., via squeezing adjacent optical fibers together).

In exemplary embodiments such as depicted in FIG. 1, the contracted optical-fiber assembly with bonding material, such as adhesive bead(s), is passed through a curing station 28 to cure the bonding material (e.g., a curable adhesive, such as a curable ultraviolet (UV) resin). The curing of the bonding material, such as by crosslinking, yields an optical-fiber ribbon in which adjacent optical fibers (e.g., substantially contiguous optical fibers) are adhesively bonded in the optical-fiber assembly (e.g., intermittently bonded optical fibers). Thereafter, the resulting optical-fiber ribbon 1 (i.e., the end product) is wound onto a reel 29.

In exemplary process embodiments, the dispenser 25 and/or the dispensing nozzle 26 (or other dispensing device) may oscillate in a direction transverse to the longitudinal direction (i.e., in the width direction) of the expanded optical-fiber assembly, and the optical-fiber assembly moves in the longitudinal direction, such as via a reel 29. The tip of the dispenser 25 (e.g., the dispensing nozzle 26) may oscillate (e.g., vibrate) in a transverse direction at a high frequency, such as between about 100 Hz and 200 Hz. In an exemplary process embodiment, the dispensing nozzle 26 may deliver liquid bonding material in fine droplets to the advancing optical-fiber assembly 10. Because of surface tension, the liquid bonding material—if provided in sufficient droplets at a sufficient frequency—will flow together to form adhesive beads (e.g., elongated beads).

Figure 3:
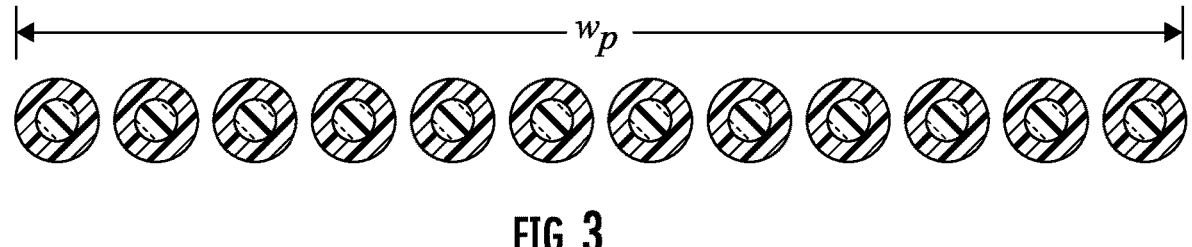
FIG. 3 depicts in a cross-section view an exemplary expanded longitudinal optical-fiber assembly in accordance with an embodiment of this disclosure.
Figure 4:
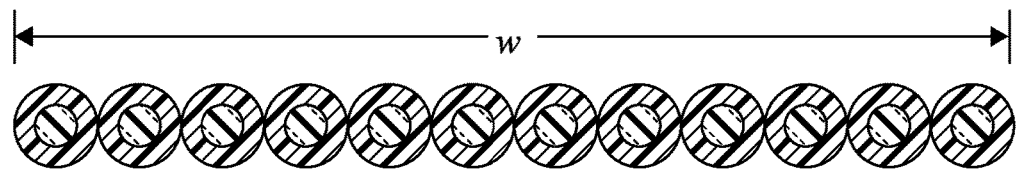
FIG. 4 depicts in a cross-section view an exemplary contracted longitudinal optical-fiber assembly in accordance with an embodiment of this disclosure.

As illustrated in FIGS. 3-4, closing the respective gaps between adjacent, spaced optical fibers in the expanded optical-fiber assembly having a processing width $w_p$ yields a contracted optical-fiber assembly having planar width w, whereby processing width $w_p$>planar width w. Typically, the contracted optical-fiber assembly 10 is an arrangement of substantially parallel optical fibers with interstices or grooves between adjacent, substantially contiguous optical fibers. With reference to FIG. 4, those having ordinary skill in the art will understand that the term "planar width w" refers to the crosswise width of a contracted optical-fiber assembly in a flattened configuration.

In some exemplary embodiments, across the width w of the contracted optical-fiber assembly for a portion of its longitudinal length, the respective gaps between adjacent optical fibers in the contracted optical-fiber assembly (and the resulting optical-fiber ribbon after curing of the bonding material) are typically less than about 20 percent of the corresponding optical-fiber diameter d, more typically less than about 10 percent of the corresponding optical-fiber diameter d, such as less than about 5 percent of the corresponding optical-fiber diameter d (e.g., less than about 2 percent or 3 percent of the corresponding optical-fiber diameter d). In some embodiments of the contracted optical-fiber assembly (e.g., across the width w of the closed optical-fiber assembly for a portion of its longitudinal length), the gaps, if any, between the adjacent optical fibers are substantially the same (e.g., evenly spaced gaps) to provide regularity. In other embodiments of the contracted optical-fiber assembly (e.g., across the width w of the closed optical-fiber assembly for a portion of its longitudinal length), the gaps, if any, between the adjacent optical fibers are not uniform across the closed optical-fiber assembly. For example, gaps between adjacent optical fibers might be relatively wider toward the middle of the closed optical-fiber assembly (and relatively narrower toward the outer portions of the closed optical-fiber assembly) to accommodate more bonding material within the central portion of the closed optical-fiber assembly. More typically, there is only de minimis spacing between adjacent optical fibers in the closed optical-fiber assembly (i.e., the contracted optical-fiber assembly), such that adjacent optical fibers are substantially contiguous to one another within the closed optical-fiber assembly. See e.g., FIGS. 4, 6, and 8A-8C. As a practical matter, however, some small gaps may exist between adjacent optical fibers along the length of the contracted optical-fiber assembly (and the resulting optical-fiber ribbon).

Figure 5:
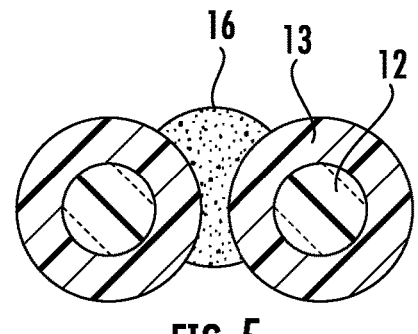
FIG. 5 depicts in a cross-section view bonding material between two adjacent optical fibers within an exemplary expanded longitudinal optical-fiber assembly in accordance with an embodiment of this disclosure.
Figure 6:
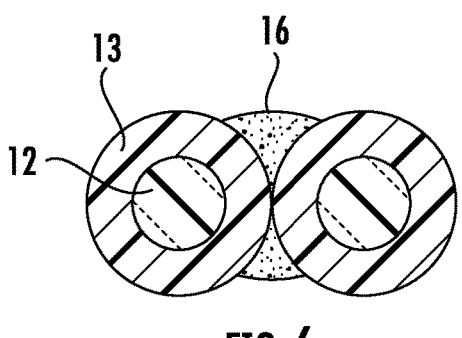
FIG. 6 depicts in a cross-section view bonding material between two adjacent optical fibers within an exemplary contracted longitudinal optical-fiber assembly in accordance with an embodiment of this disclosure.

As illustrated in FIGS. 5-6 (and without being bound by any theory), this "open-and-squeeze" processing facilitates the penetration of bonding material between adjacent optical fibers from the expanded optical-fiber assembly's first major surface (e.g., nearer its upper surface) toward the expanded optical-fiber assembly's second major surface (e.g., nearer its lower surface). Stated otherwise, the "open-and-squeeze" processing encourages the movement of bonding material from the upper portion of the optical-fiber assembly (e.g., its top half, such as above the optical-fiber assembly's elevational centerline) to a lower portion of the optical-fiber assembly (e.g., its bottom half, such as below the optical-fiber assembly's elevational centerline).

For example (but without being bound by any theory), as depicted in FIG. 5, when bonding material (e.g., curable adhesive) is deposited or otherwise directed between adjacent optical fibers in an "open configuration," the bonding material tends to aggregate between the adjacent optical fibers near the elevational centerline of the expanded optical-fiber assembly, which corresponds to the respective elevational centerlines of the adjacent optical fibers. As depicted in FIG. 6, when the adjacent optical fibers are squeezed together, such as via contraction of the expanded optical-fiber assembly during the "open-and-squeeze" processing, the bonding material is forced (e.g., squeezed) toward both the optical-fiber assembly's first and second major surfaces (e.g., the respective upper and lower portions of the contracted optical fiber assembly).

As depicted in FIG. 6, this process increases bonding area with respect to the adjacent optical fibers, thereby promoting robust bonding in the final optical-fiber ribbon without adversely affecting mechanical properties (e.g., optical-fiber breakout). For example, during optical-fiber breakout the optical-fiber ribbon's point of failure typically occurs (i) within the bonding material (e.g., the adhesive beads) without damaging the optical fiber's primary coating, the optical fiber's secondary coating, and/or the optical fiber's optional ink layer, if any, and/or (ii) at the interface between the bonding material (e.g., the adhesive beads) and the outermost protective layer (e.g., an outermost coating layer or an optional outermost ink layer, if any) without damaging the optical fiber's coating layers and/or optional ink layer, if any.

During exemplary "open-and-squeeze" processing, a plurality n of optical fibers (e.g., 12, 18, 24, or 36 optical fibers) may be initially arranged into an expanded longitudinal optical-fiber assembly having processing width $w_p$ extending crosswise to a longitudinal length of the expanded optical-fiber assembly. To facilitate better bonding between adjacent optical fibers within the resulting optical-fiber ribbon—especially the centrally positioned optical fibers—at least some of the optical fibers in the expanded optical-fiber assembly are respectively spaced apart from one another, thereby defining respective gaps between at least some adjacent optical fibers (e.g., via opening or otherwise spacing at least the central optical fibers within the optical fiber assembly). For example, typically at least one quarter of the optical fibers (e.g., at least three optical fibers, such as at least four or six optical fibers)—more typically at least one third of the optical fibers, such as one half or more of the optical fibers—are spaced apart from at least one adjacent optical fiber in the expanded optical-fiber assembly during the initial stages of exemplary "open-and-squeeze" processing (e.g., before contraction of the expanded optical-fiber assembly). Without being bound by any theory, it is thought that depositing or otherwise directing bonding material (e.g., curable adhesive) onto adjacent optical fibers in an "open configuration" during processing will lead to improved bonding between those optical fibers in the resulting optical-fiber ribbon.

Figures 7A, 8A:
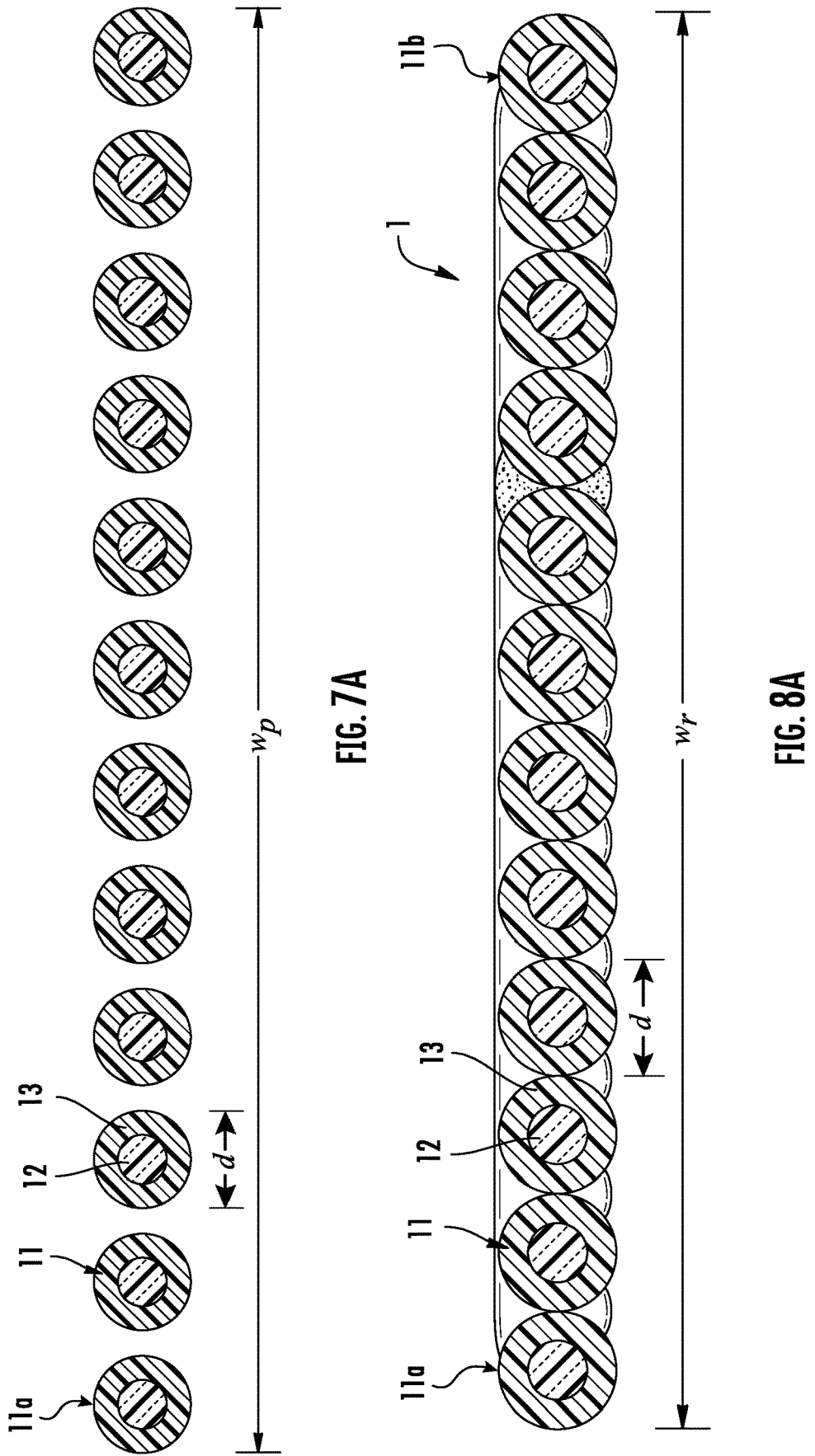
FIGS. 7A-7C depict in respective cross-section views exemplary expanded longitudinal optical-fiber assemblies in which optical fibers are spaced apart from one another in accordance with exemplary embodiments of this disclosure.
FIGS. 8A-8C depict in respective cross-section views exemplary optical-fiber ribbons in which bonding material adhesively bonds adjacent optical fibers in accordance with exemplary embodiments of this disclosure.

As illustrated in FIGS. 7A and 8A, an exemplary optical-fiber assembly 10 includes a plurality of optical fibers 11 arranged side-by-side such that the optical fibers 11 are substantially parallel to one another (e.g., aligned within the optical-fiber assembly 10). FIG. 7A depicts an exemplary expanded optical-fiber assembly 10 in which each of the twelve optical fibers is respectively spaced apart from each adjacent optical fiber (e.g., eleven corresponding gaps between twelve optical fibers). Whereas FIG. 7A illustrates an expanded optical-fiber assembly 10 in which all the optical fibers 11 are spaced apart from one another to provide respective gaps between adjacent optical fibers (e.g., during processing), FIG. 8A depicts an exemplary optical-fiber ribbon 1 in which bonding material adhesively bonds adjacent optical fibers in the optical-fiber assembly. FIGS. 7A and 8A illustrate and emphasize the reduction of a fully expanded optical-fiber assembly's processing width $w_p$ to the optical-fiber ribbon's nominal planar width $w_r$. See also FIGS. 3-4.

Figures 7B, 8B:
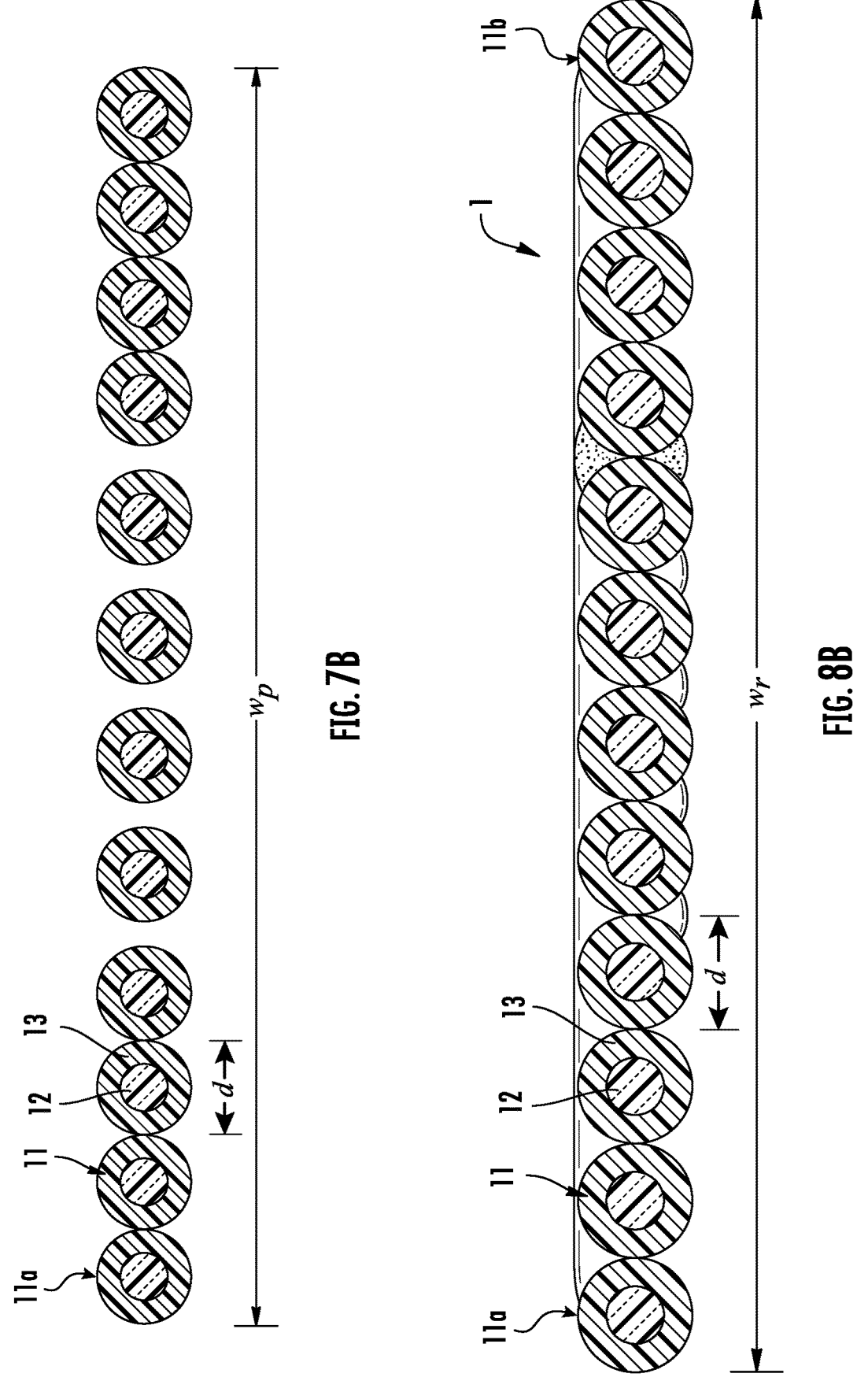

As illustrated in FIGS. 7B and 8B, an alternative optical-fiber assembly 10 likewise includes a plurality of optical fibers 11 arranged side-by-side such that the optical fibers 11 are substantially parallel to one another (e.g., aligned within the optical-fiber assembly 10). FIG. 7B, however, depicts an exemplary expanded optical-fiber assembly 10 in which only the middle six (6) optical fibers are spaced apart from one another (e.g., yielding five corresponding gaps between the middle six optical fibers). As such, six optical fibers (e.g., one half) are spaced apart from at least one adjacent optical fiber in this exemplary expanded optical-fiber assembly 10. Whereas FIG. 7B illustrates an alternative expanded optical-fiber assembly 10 in which several optical fibers 11 are spaced apart from one another to provide respective gaps between adjacent optical fibers in the central portion of the optical-fiber assembly 10 (e.g., during processing), FIG. 8B depicts the resulting exemplary optical-fiber ribbon 1 in which bonding material adhesively bonds adjacent optical fibers in the optical-fiber assembly with reinforced bonding of the middle six optical fibers. FIGS. 7B and 8B illustrate and emphasize the reduction of a partially expanded optical-fiber assembly's processing width $w_p$ to the optical-fiber ribbon's nominal planar width $w_r$.

Figures 7C, 8C:
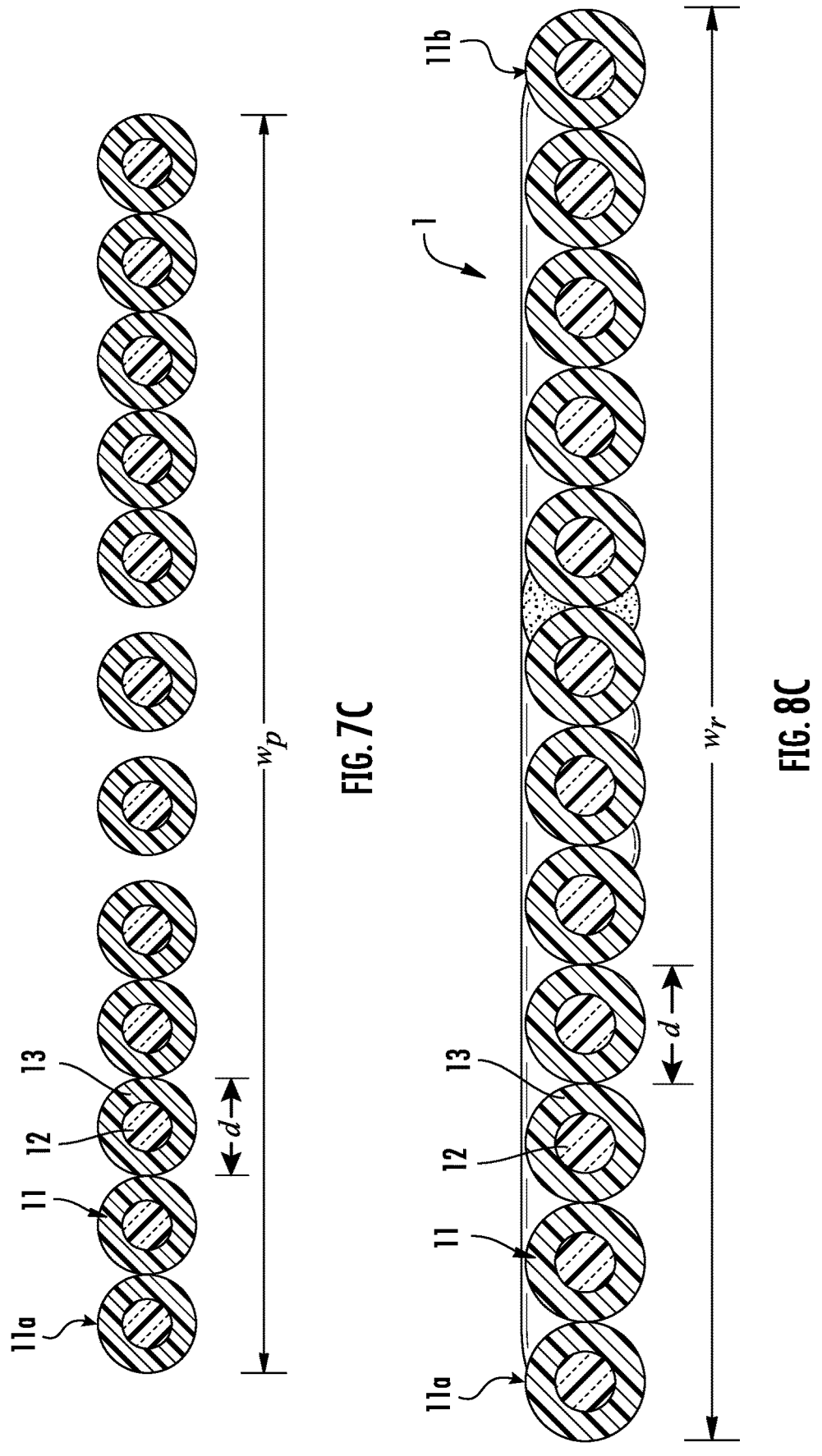

As illustrated in FIGS. 7C and 8C, an alternative optical-fiber assembly 10 likewise includes a plurality of optical fibers 11 arranged side-by-side such that the optical fibers 11 are substantially parallel to one another (e.g., aligned within the optical-fiber assembly 10). FIG. 7C, however, depicts an exemplary expanded optical-fiber assembly 10 in which only the middle four (4) optical fibers are spaced apart from one another (e.g., yielding three corresponding gaps between the middle four optical fibers). As such, only four optical fibers (e.g., one third) are spaced apart from at least one adjacent optical fiber in this exemplary expanded optical-fiber assembly 10. Whereas FIG. 7C illustrates an alternative expanded optical-fiber assembly 10 in which several optical fibers 11 are spaced apart from one another to provide respective gaps between adjacent optical fibers in the central portion of the optical-fiber assembly 10 (e.g., during processing), FIG. 8C depicts the resulting exemplary optical-fiber ribbon 1 in which bonding material adhesively bonds adjacent optical fibers in the optical-fiber assembly with reinforced bonding of the middle four optical fibers. FIGS. 7C and 8C similarly illustrate and emphasize the reduction of a partially expanded optical-fiber assembly's processing width $w_p$ to the optical-fiber ribbon's nominal planar width $w_r$.

Within exemplary optical-fiber ribbons 1 like those depicted in FIGS. 8A-8C, each optical fiber 11 may be closely spaced or contiguous with an adjacent optical fiber 11 but typically should not cross over one another along the length of the optical-fiber assembly 10. Optical fibers 11 usually include a component glass fiber 12 and one or more surrounding coating layers 13. See FIGS. 7A-7C and FIGS. 8A-8C. Those having ordinary skill in the art will understand the various kinds of primary coatings, secondary coatings, and ink layers, as well as the structures and thicknesses thereof. This application hereby incorporates by reference commonly owned U.S. Pat. No. 8,265,442 for a Microbend-Resistant Optical Fiber and U.S. Pat. No. 8,600, 206 for a Reduced-Diameter Optical Fiber.

The optical-fiber assembly 10 (and the resulting optical-fiber ribbon 1) have a substantially planar (i.e., flattened) geometry that defines a relatively narrow height, a relatively wide width, and a substantially continuous length (e.g., over 1,000 meters, such as 5,000 meters or more). As used herein, an optical-fiber assembly 10, such as depicted in either FIG. 3 or FIG. 4, or an optical-fiber ribbon 1, such those depicted in FIGS. 8A-8C, inherently defines an upper side (e.g., the top portion), a lower side (e.g., the bottom portion), a left edge, and a right edge. The respective upper and lower sides define the major surfaces of the optical-fiber assembly 10 (and the resulting optical-fiber ribbon 1), such as shown in the exemplary expanded optical-fiber assembly 10 depicted in FIG. 2. Those having ordinary skill in the art will appreciate that flipping the optical-fiber assembly (or the corresponding optical-fiber ribbon) 180 degrees over its major transverse axis will reverse the top and bottom, and so the terms can sometimes be used interchangeably herein depending on the frame of reference and context. Similarly, those having ordinary skill in the art will appreciate that yaw rotating the optical-fiber assembly 180 degrees will reverse the right edge and left edge, and so the terms can sometimes be used interchangeably herein depending on the frame of reference and context. Accordingly, as used herein, terms and descriptions such as "first major surface" and "second, opposite major surface" refer to the respective upper and lower sides of the optical-fiber assembly 10 (and the resulting optical-fiber ribbon), or vice versa depending on the frame of reference and context.

As shown in FIGS. 8A-8C, the optical fibers 11 are arranged in parallel and respectively adjacent to each other in a plane. As such, the nominal width $w_r$ of the optical-fiber ribbon 1 reflects the number n and diameter d of the optical fibers (i.e., $w_r \approx n \times d$). Typically, each optical fiber has a substantially circular cross section, and all the optical fibers in an optical-fiber ribbon have substantially the same nominal diameter. In an exemplary embodiment, the nominal width $w_r$ of the optical-fiber ribbon is between about 2 millimeters and 10 millimeters (e.g., between 2 millimeters and 6 millimeters). In practice, the optical fibers are usually substantially contiguous to one another, although some small gaps may exist between adjacent optical fibers along the optical-fiber ribbon's length. The nominal width $w_r$ of the resulting optical-fiber ribbon typically corresponds to the width w of the contracted optical-fiber assembly (i.e., $w_r \approx w \approx n \times d$). See FIG. 4 and FIGS. 8A-8C. Typically, bonding material on or at the optical-fiber assembly's first and second major surfaces adhesively bonds adjacent optical fibers in the optical-fiber assembly 10 to yield the optical-fiber ribbon 1. As such, an exemplary optical-fiber ribbon having a plurality of substantially parallel, substantially contiguous optical fibers includes bonding material (e.g., cured adhesive or other matrix resin) at both its upper and lower portions (e.g., both above and below the optical-fiber assembly's elevational centerline). See FIG. 6 and FIGS. 8A-8C. Those having ordinary skill in the art will appreciate that this bonding configuration creates discrete, intermittent bonds (e.g., top and bottom) between adjacent optical fibers (e.g., discrete upper and lower bonds between substantially contiguous optical fibers in the optical-fiber ribbon).

In an exemplary embodiment, each optical fiber has a diameter d of between 240 microns and 260 microns, more typically about 250 microns. Alternatively, the optical fibers may have a reduced diameter d, such as between about 180 microns and 230 microns (e.g., nominal 200-micron optical fibers). In an exemplary embodiment, the optical-fiber assembly includes between two and 36 optical fibers (including 2 and 36), such as between twelve and 24 optical fibers (including 12 and 24). In other exemplary embodiments, the optical-fiber assembly includes between two and 16 optical fibers (including 2 and 16), such as four, eight, and twelve optical fibers. For example, an exemplary optical-fiber ribbon formed of twelve (12) 250-micron optical fibers typically yields a nominal width $w_r$ of 3000 microns (i.e., 3 millimeters). Similarly, an exemplary optical-fiber ribbon formed of twelve (12) 200-micron reduced-diameter optical fibers typically yields a nominal width $w_r$ of 2400 microns (i.e., 2.4 millimeters), and an exemplary optical-fiber ribbon formed of twelve (12) 180-micron reduced-diameter optical fibers typically yields a nominal width $w_r$ of 2160 microns (i.e., 2.16 millimeters). As noted, however, in some exemplary embodiments, across the width $w_r$ of the optical-fiber ribbon for a portion of its longitudinal length, the optical-fiber ribbon might include small gaps between at least some of the adjacent optical fibers such that the nominal width $w_r$ of the optical-fiber ribbon might be slightly greater (e.g., 3-5 percent wider).

As noted, in an exemplary process embodiment, the dispenser 25 and/or the dispensing nozzle 26 move cross-wise substantially corresponding to the processing width $w_p$ of the expanded optical-fiber assembly 10. In this way, the bonding material is applied as an adhesive bead (or incremental beads) across at least one major surface of the expanded optical-fiber assembly (e.g., in a primary bonding-material pattern on the upper surface substantially across the processing width of the expanded optical-fiber assembly). As will be understood by those having ordinary skill in the art, providing an adhesive bead "substantially across the width" of the expanded optical-fiber assembly promotes bonding of adjacent optical fibers to yield an optical-fiber ribbon (e.g., the adhesive deposition patterns extend to the outermost opposite optical fibers in the optical-fiber assembly).

In a related process embodiment, the dispenser 25 and/or the dispensing nozzle 26 move crosswise substantially corresponding to the lateral distance ($w_p$–2d) between the two outermost optical fibers in the expanded optical-fiber assembly. As will be understood by those having ordinary skill in the art, this lateral distance ($w_p$–2d) is the separation between the outermost gaps in the expanded optical-fiber assembly (e.g., as defined by the respective interfaces of each outermost optical fiber and its adjacent gap). See FIG. 2. As used herein, terms like "substantially corresponding to the width" and "substantially corresponding to the lateral distance" can refer to the movement of a dispensing nozzle and/or the corresponding adhesive deposition patterns, which typically extend to the outermost opposite optical fibers in the optical-fiber assembly (e.g., opposite edge portions of the optical-fiber assembly).

Typically, the adhesive beads bonding adjacent optical fibers in the optical-fiber assembly form a regular pattern (continuous and/or discontinuous) across the width of the contracted optical-fiber assembly, such as a zigzag-like pattern, a sawtooth-like pattern, or a sinusoidal-like pattern having a peak-to-valley amplitude substantially between (i) the lateral distance between the two outermost optical fibers (w–2d) and (ii) the width w of the optical-fiber assembly. (Some excess bonding material may be present outside one or both outermost optical fibers in the optical-fiber ribbon.) In some exemplary process embodiments, the dispensing nozzle may pause when positioned above gaps in the expanded optical-fiber assembly to deposit bonding material as longitudinal, rectilinear adhesive beads into and/or near to the respective gaps (e.g., gaps between adjacent optical fibers).

In process embodiments in which the dispenser 25 and/or the dispenser nozzle 26 move crosswise substantially corresponding to the (i) the lateral distance between the two outermost optical fibers ($w_p$–2d) and (ii) the processing width $w_p$ of the expanded optical-fiber assembly, the application of bonding material may periodically or intermittently stop (e.g., while the optical-fiber assembly continues to advance at linear velocity v) to achieve recurring adhesive-free gaps in which no bonding material is present across the processing width $w_p$ of the expanded optical-fiber assembly for a portion of its longitudinal length. In this way, the intermittent application of bonding material to the expanded optical-fiber assembly achieves exemplary optical-fiber ribbons having adhesive-free gaps in which no bonding material is present across the width w of the contracted optical-fiber assembly for a portion of its longitudinal length.

In alternative process embodiments, the dispenser 25 and/or the dispensing nozzle 26 move crosswise but "overshoot" the processing width $w_p$ of the expanded optical-fiber assembly 10. That is, the dispenser 25 and/or dispensing nozzle 26 move an amplitude $A_d$ measured crosswise to the longitudinal length of the optical-fiber assembly 10, wherein the dispenser's amplitude $A_d$ exceeds the optical-fiber assembly's processing width $w_p$. In this way, the bonding material 16 is applied as an adhesive bead across at least one major surface of the optical-fiber assembly (e.g., in a primary bonding-material pattern on the upper surface substantially across the width of the expanded optical-fiber assembly) to promote the bonding of adjacent optical fibers. The dispenser 25 and/or the dispensing nozzle 26 apply bonding material to each optical fiber 11 in the expanded optical-fiber assembly 10 to yield an optical-fiber ribbon in which the adhesive deposition patterns extend to the outermost opposite optical fibers in the contracted optical-fiber assembly.

For example, in many process embodiments, the dispenser 25 and/or the dispensing nozzle 26 repeatedly move across the processing width $w_p$ of the expanded optical-fiber assembly 10 beyond both a first outermost optical fiber 11a in the optical-fiber assembly and an opposite second outermost optical fiber 11b in the optical-fiber assembly to apply bonding material to each optical fiber 11 in the expanded optical-fiber assembly 10. More generally, the dispenser 25 and/or the dispensing nozzle 26 may overshoot both edges of the optical-fiber assembly (e.g., the first outermost optical fiber 11a and the opposite second outermost optical fiber 11b in the expanded optical-fiber assembly 10) or only one edge of the optical-fiber assembly (e.g., either the first outermost optical fiber 11a or the opposite second outermost optical fiber 11b in the optical-fiber assembly 10). See e.g., FIG. 2.

This "overshooting" technique can be advantageous because it can produce an optical-fiber ribbon having recurring adhesive-free gaps (e.g., areas in which essentially no bonding material is present across the width w of the contracted optical-fiber assembly for a portion of its longitudinal length) while the bonding material is applied (e.g., continuously applied) to the expanded optical-fiber assembly. An exemplary optical-fiber ribbon having intermittent or recurrent gaps along its longitudinal length in which substantially no bonding material is present across its width can facilitate mass-fusion splicing via a mass-fusion splicing machine. The intermittent gaps without bonding material (e.g., adhesive-free gaps, areas, zones, or portions) help to reduce or eliminate bonding-material interference as the optical-fiber ribbon is positioned within an alignment chuck, which is used to secure an optical-fiber ribbon in during preparations for mass-fusion splicing.

By way of non-limiting example with respect to representative 12-optical-fiber ribbons, exemplary adhesive-free gaps have a minimum length (as measured along the longitudinal length of the optical-fiber assembly) of at least 15 millimeters, such as at least 20 millimeters to accommodate conventional alignment chucks. Typically, exemplary adhesive-free gaps have a minimum length between about 25 millimeters and 150 millimeters, such as between about 30 millimeters and 100 millimeters (e.g., 35-75 millimeters, such as about 50 millimeters). Exemplary optical-fiber ribbons having intermittent gaps along the longitudinal length in which no bonding material is present across the width of the optical-fiber ribbons are disclosed in in commonly assigned U.S. Pat. No. 11,460,652 for an Optical-Fiber Ribbon with Adhesive-Free Gaps, which is hereby incorporated by reference in its entirety.

More generally, the "overshooting" technique can yield adhesive beads that bond adjacent optical fibers in regular patterns (either continuous or discontinuous) across the width of the contracted optical-fiber assembly, such as a zigzag-like pattern, a sawtooth-like pattern, or a sinusoidal-like pattern having a peak-to-valley amplitude substantially between (i) the lateral distance between the two outermost optical fibers (w−2d) and (ii) the width w of the contracted optical-fiber assembly (and the resulting optical-fiber ribbon). Continuous beads typically extend across the full processing width $w_p$ of the expanded optical-fiber assembly and, after contraction, the full width w of the contracted optical-fiber assembly. (As noted, some excess bonding material may be present outside one or both outermost optical fibers in the optical-fiber ribbon.)

In one exemplary process embodiment, the dispenser 25 and/or dispensing nozzle 26 continuously reciprocate across the processing width $w_p$ of the expanded optical-fiber assembly. This uninterrupted reciprocation can produce portions of substantially continuous adhesive beads (e.g., zigzag-like patterns or sinusoidal-like patterns across the optical-fiber assembly's first major surface) between the outermost optical fibers in the optical-fiber assembly, such as depicted in FIGS. 11A, 13A,16A, and 19A.

Figures 17A, 17B:
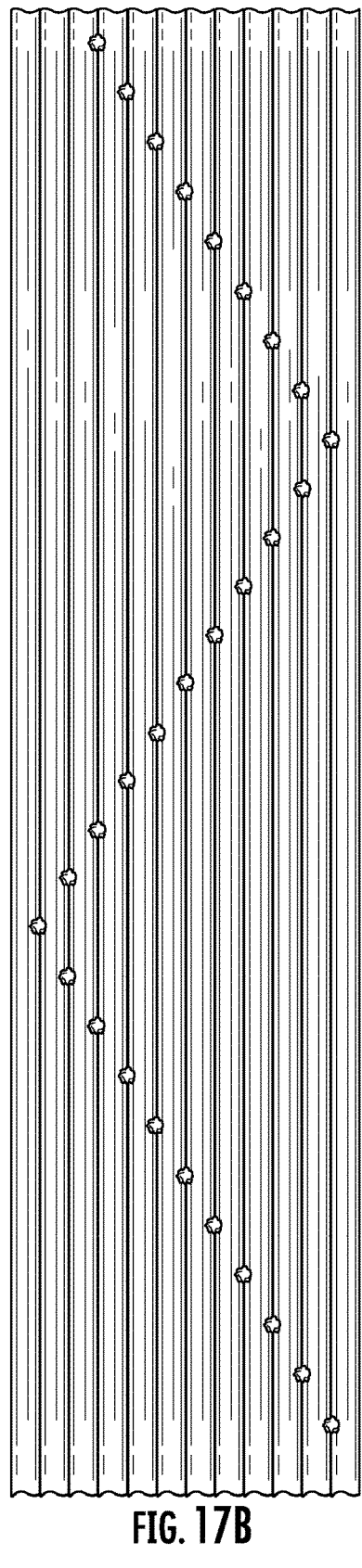
FIGS. 17A and 17B depict in respective views opposite sides of a section of another exemplary optical-fiber ribbon (e.g., made in accordance with the exemplary process depicted in FIG. 14).
Figure 20A:
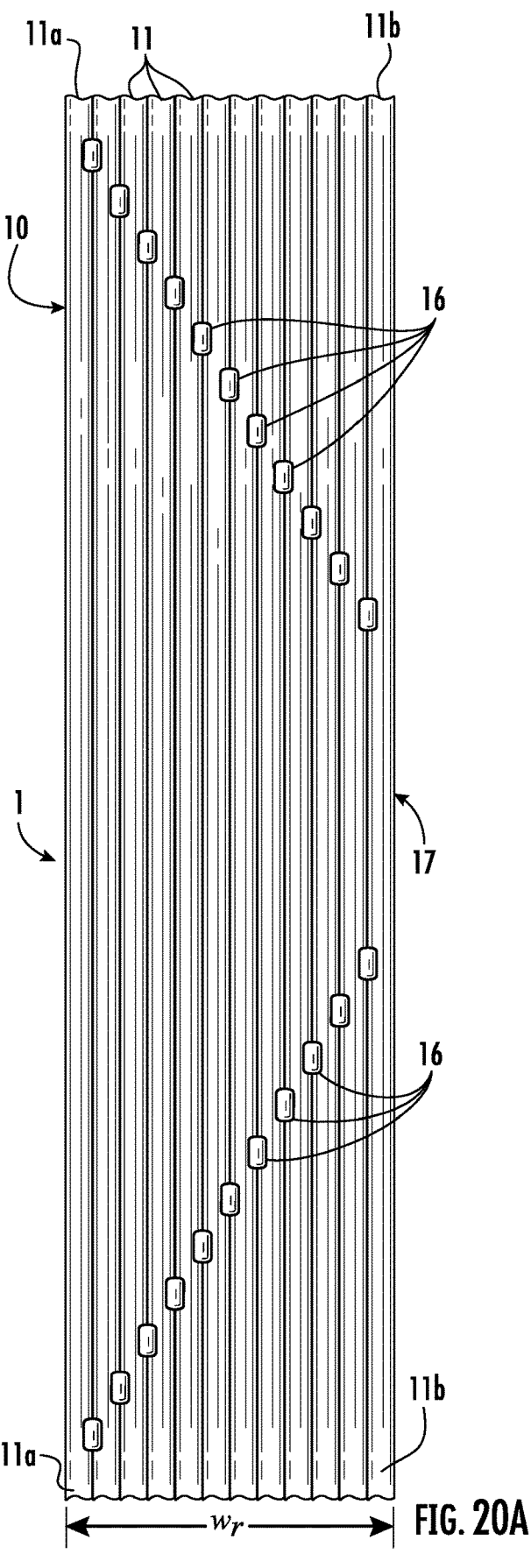
FIGS. 20A and 20B depict in respective views opposite sides of a section of another exemplary optical-fiber ribbon (e.g., made in accordance with the exemplary process depicted in FIG. 18).

In another exemplary process embodiment, the dispenser 25 and/or dispensing nozzle 26 reciprocate in intermittent steps across the processing width $w_p$ of the optical-fiber assembly (e.g., via linear reciprocation or revolution around a central axis). For example, the dispensing nozzle may pause when positioned above gaps in the expanded optical-fiber assembly to deposit bonding material as longitudinal, rectilinear adhesive beads within the respective gaps (e.g., spaces between adjacent optical fibers). Such intermittent reciprocation can produce rectilinear adhesive beads (e.g., rectilinear-bead patterns across the optical-fiber assembly's first major surface) between the outermost optical fibers in the optical-fiber assembly, such as depicted in FIGS. 17A and 20A.

Those having ordinary skill in the art will appreciate that, with respect to the optical-fiber ribbon 1 (and the intermediate optical-fiber assembly 10), the figures schematically exaggerate the width relative to length, such as to illustrate the characteristics of the various bonding-material patterns.

In accordance with the foregoing, it is within the scope of the present disclosure to have either one substantially continuous adhesive bead or a series of discontinuous beads that secure (e.g., affix) the optical fibers within the optical-fiber ribbon. In an exemplary embodiment, bonding material is applied as an adhesive bead (or incremental beads) across at least one major surface of the expanded optical-fiber assembly (e.g., in a primary bonding-material pattern on the upper surface substantially across the processing width of the expanded optical-fiber assembly). As noted, the optical-fiber ribbon (and the intermediate optical-fiber assembly) can be viewed as a ribbon-like assembly inherently defining an upper surface (e.g., the top portion), a lower surface (e.g., the bottom portion), and two side edges. With respect to an optical-fiber ribbon (and its corresponding contracted optical-fiber assembly), the upper and lower surfaces (i.e., the respective major surfaces) are planar-like but not completely flat, because they are formed of a substantially parallel arrangement of optical fibers. As such, the corresponding upper and lower surfaces have parallel longitudinal grooves between adjacent optical fibers. Those having ordinary skill in the art will understand the optical fibers may not be perfectly parallel but rather substantially parallel in practice.

The adhesive beads typically follow a distorted sinusoidal pattern, a zigzag-like pattern, or a sawtooth-like pattern to bond adjacent optical fibers within the optical-fiber ribbon. For example, along a portion of the optical-fiber assembly's longitudinal length, the bonding material may be applied as a plurality of successive rectilinear beads arranged lengthwise along the optical-fiber assembly (e.g., the successive beads forming a stepwise pattern across the optical-fiber assembly), so that the adhesive beads are configured to form elongated bonds between adjacent optical fibers in the contracted optical-fiber assembly. In some exemplary embodiments, the dispensing nozzle may pause its movement when positioned above gaps in the expanded optical-fiber assembly to deposit bonding material as longitudinal, rectilinear adhesive beads near and/or within the respective gaps. In exemplary embodiments, the adhesive bead (e.g., a substantially continuous bead of bonding material) forms a kind of bonding thread having a mass (in grams) per 10,000 meters of between 60 and 120 dtex, such as between 75 and 110 dtex, in the optical-fiber ribbon.

In this regard, the bonding material between adjacent optical fibers (e.g., contiguous optical fibers) will form a first triangular cross section at or near the optical-fiber assembly's first major surface (e.g., an upper triangular cross section at or near the optical-fiber assembly's upper surface) and a second triangular cross section at or near the optical-fiber assembly's second major surface (e.g., an lower triangular cross section at or near the optical-fiber assembly's lower surface). See FIG. 6 and FIGS. 8A-8C. As noted, increasing the bonding area between adjacent optical fibers (e.g., both upper and lower beads between contiguous optical fibers) promotes robust bonding in the optical-fiber ribbon without adversely affecting mechanical properties (e.g., optical-fiber breakout).

In an exemplary embodiment, the bonding material has an elongation at break of at least 150 percent, typically between 200 percent and 300 percent, such as between 200 percent and 250 percent. In an exemplary embodiment, the bonding material has a modulus of elasticity (or Young's modulus) of between 1 MPa and 50 MPa (e.g., between 5 MPa and 45 MPa), such as between 1 MPa and 10 MPa, between 10 MPa and 20 MPa, between 15 MPa and 30 MPa, or between 20 MPa and 40 MPa. In another exemplary embodiment, the bonding material has a modulus of elasticity (or Young's modulus) of between 1 MPa and 15 MPa, such as between 1 MPa and 10 MPa (e.g., between about 5 MPa and 10 MPa, such as between 6 MPa and 9 MPa). In yet another exemplary embodiment, the bonding material has a modulus of elasticity (or Young's modulus) of between 15 MPa and 40 MPa, such as between 20 MPa and 35 MPa (e.g., about 20-25 MPa).

In this regard, and as discussed in commonly assigned U.S. Pat. No. 11,256,051, which is hereby incorporated by reference in its entirety, elongation at break (e.g., strain at break) and modulus of elasticity can be measured on a dog-bone-shaped film sample using the following method: ASTM D638-14 ("*Standard Test Method for Tensile Properties of Plastics*"), which is hereby incorporated by reference in its entirety. In exemplary embodiments, the bonding material is a substantially fully cured curable adhesive (e.g., at least about 95 percent cured, such as about 98 percent cured), and the bonding material positioned in situ on an optical-fiber ribbon reflects these bonding-material properties.

Figure 9:
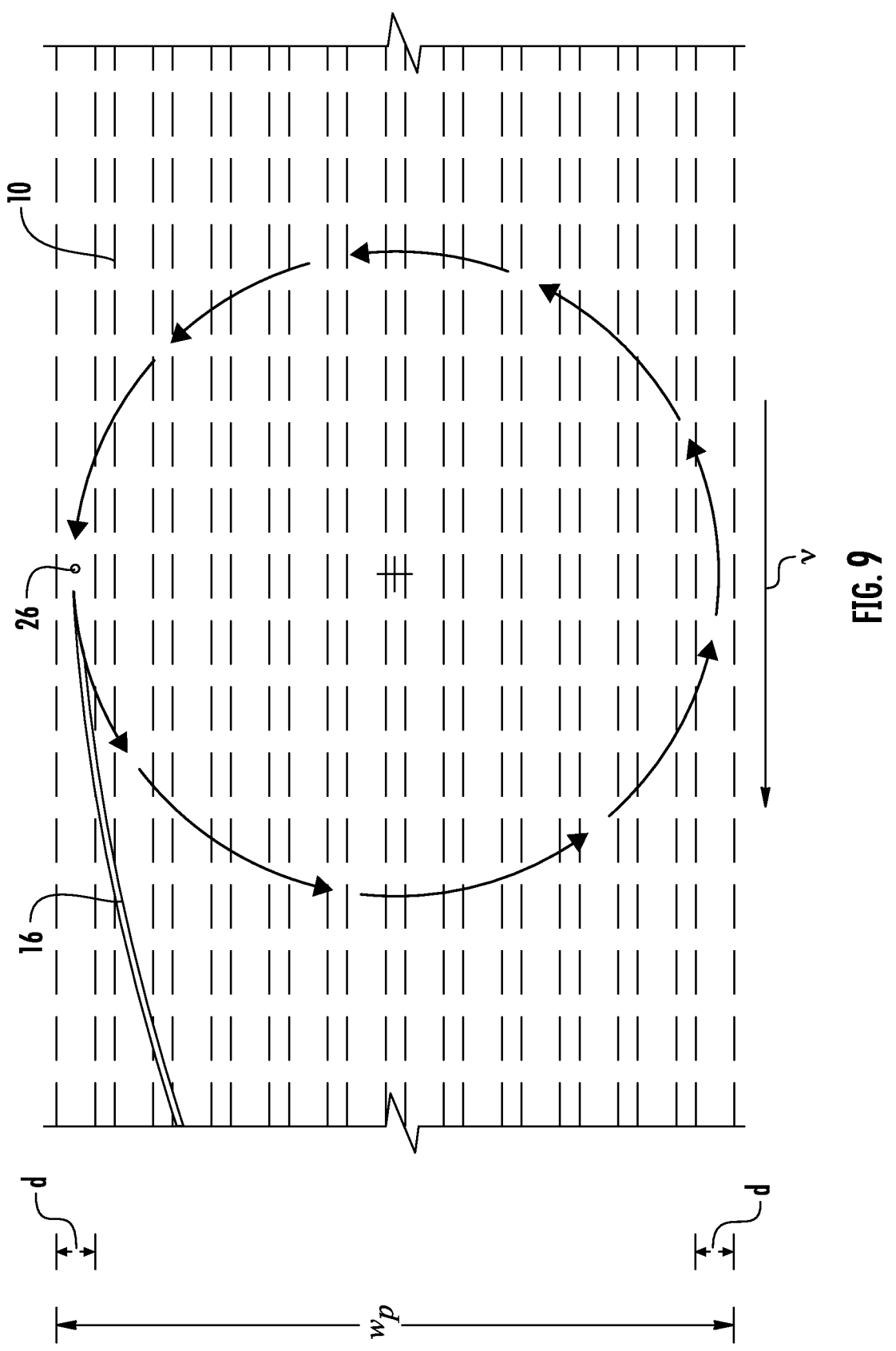
FIG. 9 depicts in a top view a portion of an exemplary process for making an optical-fiber ribbon in accordance with an embodiment of this disclosure.
Figure 10:
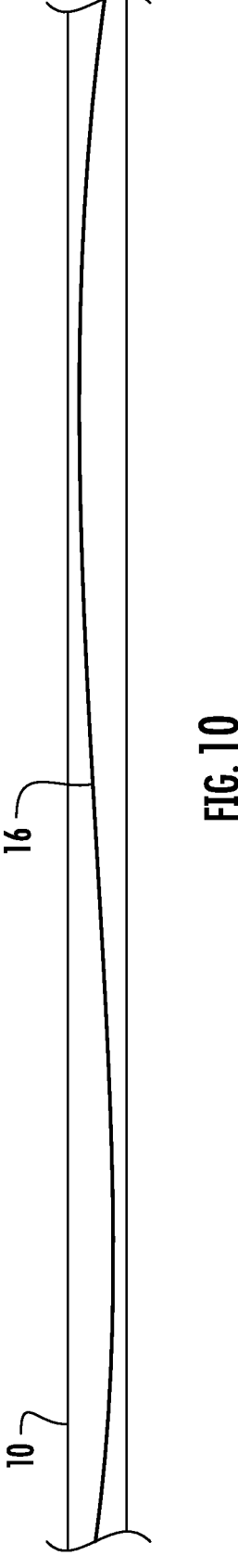
FIG. 10 depicts in a top view a section of an exemplary optical-fiber ribbon having an adhesive bead forming a distorted sinusoidal pattern substantially across the width of the optical-fiber assembly (e.g., made in accordance with the exemplary process depicted in FIG. 9).

In an exemplary process embodiment depicted in FIG. 9, the dispensing nozzle 26 revolves at a constant speed (i.e., a constant orbital angular velocity) around a central axis at a cyclical frequency r (i.e., the period to complete a revolution around the central axis). By controlling the relationship between linear velocity v of the optical-fiber assembly 10 (e.g., the expanded optical-fiber assembly) and the cyclical frequency r of the dispensing nozzle 26, a near (or distorted) sinusoidal pattern of bonding material 16 (e.g., a substantially continuous adhesive bead) is achieved across a planar-like surface of the expanded optical-fiber assembly 10 (and the resulting optical-fiber ribbon). See FIG. 10.

Typically, the central axis of the dispensing nozzle's orbit is centrally positioned above (or otherwise corresponding to) the midline ($w_p/2$) of the expanded optical-fiber assembly 10 (e.g., the central axis likewise substantially intersects the middle longitudinal axis of the resulting, contracted optical-fiber ribbon). See FIG. 9. For example, the dispensing nozzle 26 may revolve around a central axis that is centrally positioned to substantially intersect the expanded optical-fiber assembly's midline ($w_p/2$) (e.g., via a continuous or intermittent dispenser movement) to apply bonding material to each optical fiber in the expanded optical-fiber assembly. In this regard, for a 12-fiber ribbon the midline corresponds to the lengthwise gap or groove between the sixth and seventh optical fibers, and for a 24-fiber ribbon the midline corresponds to the lengthwise gap or groove between the twelfth and the thirteenth optical fibers.

In an exemplary embodiment such as depicted in FIG. 9, the dispensing nozzle 26 revolves around a central axis in an orbit having a diameter that substantially corresponds to the processing width $w_p$ of the expanded optical-fiber assembly 10. Accordingly, the dispensing nozzle 26 deposits bonding material (e.g., curable adhesive) in a sinusoidal-like pattern having a peak-to-valley amplitude substantially between (i) the lateral distance between the two outermost optical fibers ($w_p-2d$) and (ii) the processing width $w_p$ of the expanded optical-fiber assembly. In this way, the bonding material 16 is applied as an adhesive bead across at least one major surface of the expanded optical-fiber assembly (e.g., its upper surface). In a related embodiment, the dispenser nozzle 26 revolves around the central axis in an orbit having a diameter that substantially corresponds to the lateral distance ($w_p-2d$) between the two outermost optical fibers in the expanded optical-fiber assembly. As will be understood by those having ordinary skill in the art, this lateral distance ($w_p-2d$) is the separation between the outermost optical fibers in the expanded optical-fiber assembly during processing. See FIG. 9.

After contraction of the expanded optical-fiber assembly and curing of the bonding material 16, the adhesive bead bonding adjacent optical fibers in the resulting optical-fiber ribbon 1 typically forms a distorted sinusoidal pattern across the width w of the contracted optical-fiber assembly 10 (and the resulting optical-fiber ribbon 1), the distorted sinusoidal pattern having a peak-to-valley amplitude substantially between (i) the lateral distance ($w-2d$) between the two outermost optical fibers 11a, 11b and (ii) the width w of the contracted optical-fiber assembly 10. The deposited adhesive bead across the width of the optical-fiber assembly may have a distorted sinusoidal pattern repeatedly forming (i) peaks at one edge portion of the optical-fiber assembly and (ii) valleys at an opposite edge portion of the optical-fiber assembly. Typically, these distorted sinusoidal peaks and distorted sinusoidal valleys have different respective shapes.

Figure 11:
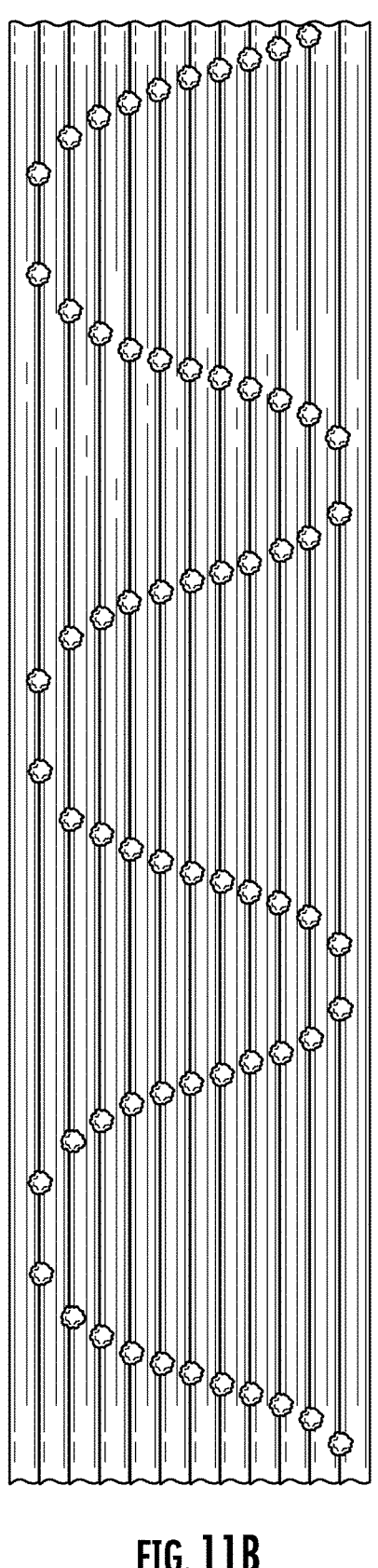
FIGS. 11A and 11B depict in respective views opposite sides of a section of an exemplary optical-fiber ribbon (e.g., made in accordance with the exemplary process depicted in FIG. 9).

FIGS. 11A and 11B depict opposite sides (e.g., opposite substantially planar surfaces) of an exemplary optical-fiber ribbon 1 in which, for a portion of the contracted optical-fiber assembly's longitudinal length, bonding material (e.g., cured adhesive or other matrix resin) forms a primary bonding-material pattern across the contracted optical-fiber assembly's first major surface and a corresponding secondary bonding-material pattern across the contracted optical-fiber assembly's second major surface. Further to the exemplary process embodiment depicted in FIG. 9, FIG. 11A depicts a substantially continuous sinusoidal adhesive bead across the first major surface of the contracted optical-fiber assembly 10 (e.g., the upper surface of the optical-fiber ribbon 1), and FIG. 11B depicts intermittent beads of bonding material in a sinusoidal pattern across the second major surface of the contracted optical-fiber assembly 10 (e.g., the lower surface of the optical-fiber ribbon 1). The bonding material 16 forming the primary bonding-material pattern and the corresponding secondary bonding-material pattern incrementally bonds each adjacent pair of optical fibers in the contracted optical-fiber assembly (e.g., the optical fiber ribbon).

As noted, during processing, the bonding material passes, migrates, or otherwise moves from an upper portion of the optical-fiber assembly (e.g., its top half) to a lower portion of the optical-fiber assembly (e.g., its bottom half) between the respective gaps between adjacent, spaced optical fibers in the expanded optical-fiber assembly. See FIG. 5. Such processing may yield a respective primary bonding-material pattern, namely a substantially continuous sinusoidal adhesive bead at the upper surface of the optical-fiber ribbon as illustrated in FIG. 11A, and a corresponding secondary bonding-material pattern, namely intermittent beads of bonding material at the lower surface of the optical-fiber ribbon as illustrated in FIG. 11B.

As noted, terms like "substantially corresponding to the width" and "substantially corresponding to the lateral distance" can refer to the movement of a dispensing nozzle and/or the corresponding adhesive deposition patterns, which typically extend to the outermost, opposite optical fibers 11a, 11b in the optical-fiber assembly (e.g., opposite edge portions of the optical-fiber assembly) and the resulting optical-fiber ribbon.

Figure 12:
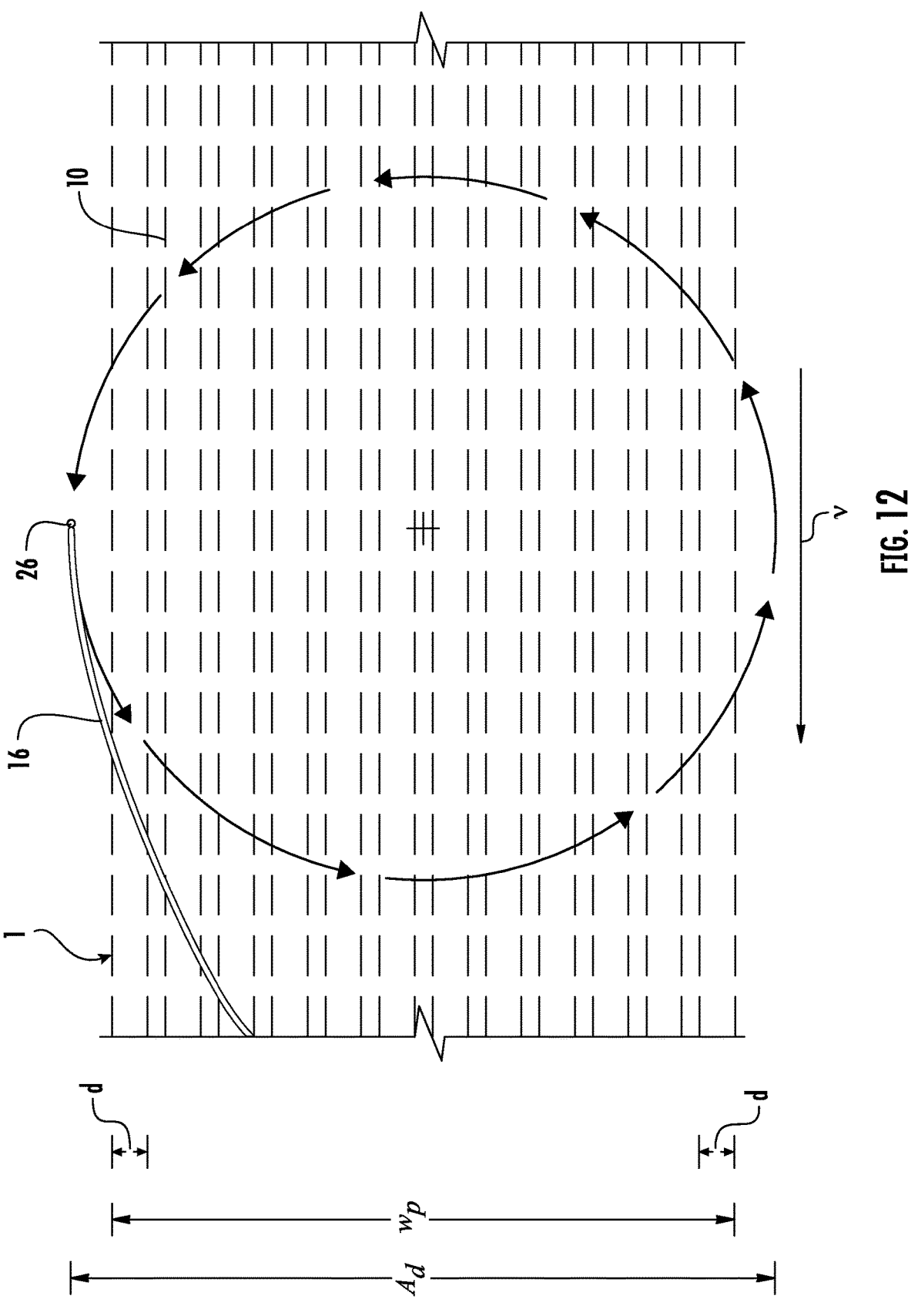
FIG. 12 depicts in a top view a portion of an exemplary process for making an optical-fiber ribbon in accordance with an embodiment of this disclosure.

FIG. 12 depicts an alternative, exemplary process embodiment in which the dispensing nozzle 26 (or other dispensing device) revolves around a central axis at a cyclical frequency r (e.g., moves in a circular or elliptical motion over the optical-fiber assembly 10) with an amplitude $A_d$ exceeding the expanded optical-fiber assembly's processing width $w_p$. In a related process embodiment, the dispensing nozzle 26 revolves around a central axis that is centrally positioned to substantially intersect the expanded optical-fiber assembly's midline ($w_p/2$) (e.g., via a continuous or intermittent dispenser movement) to apply bonding material to each optical fiber in the expanded optical-fiber assembly 10 (e.g., while overshooting both edges of the expanded optical-fiber assembly). For example, the deposition pattern of the deposited adhesive bead, some of which "overshoots" the expanded optical-fiber assembly 10, may have a distorted sinusoidal pattern repeatedly forming (i) peaks outside an edge portion of the expanded optical-fiber assembly and (ii) valleys outside an opposite edge portion of the expanded optical-fiber assembly. Typically, these distorted sinusoidal peaks and distorted sinusoidal valleys have different respective deposition shapes.

Figures 13A, 13B:
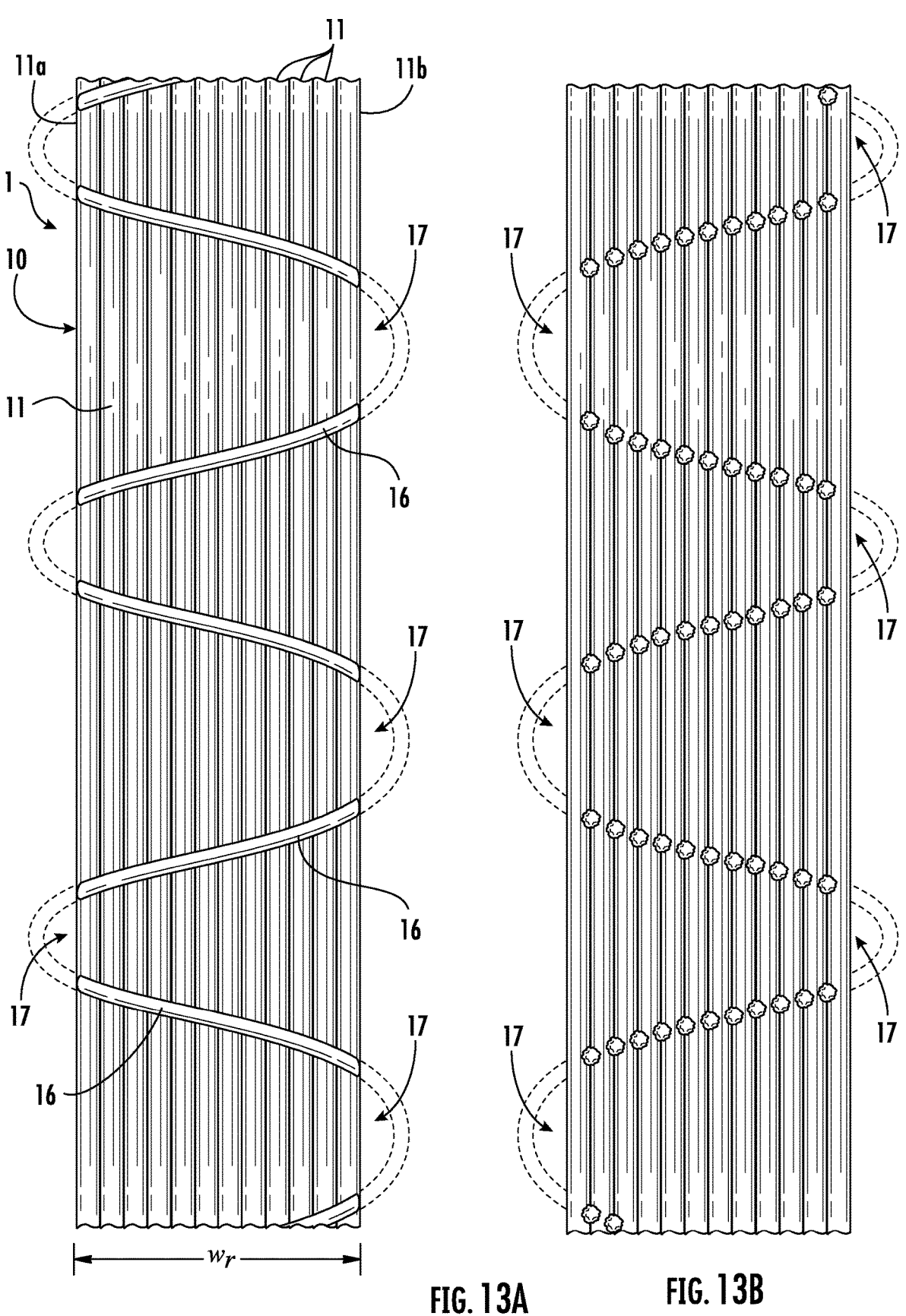
FIGS. 13A and 13B depict in respective views opposite sides of a section of an exemplary optical-fiber ribbon (e.g., made in accordance with the exemplary process depicted in FIG. 12).

FIGS. 13A and 13B depict opposite sides (e.g., opposite substantially planar surfaces) of an exemplary optical-fiber ribbon 1 in which, for a portion of the contracted optical-fiber assembly's longitudinal length, bonding material (e.g., cured adhesive or other matrix resin) forms a primary bonding-material pattern across the contracted optical-fiber assembly's first major surface and a corresponding secondary bonding-material pattern across the contracted optical-fiber assembly's second major surface. Further to the exemplary process embodiment depicted in FIG. 12, FIG. 13A depicts incrementally continuous adhesive beads (e.g., sinusoidal adhesive segments) across the first major surface of the contracted optical-fiber assembly 10 (e.g., the upper surface of the optical-fiber ribbon 1), and FIG. 13B depicts intermittent beads of bonding material in a sinusoidal pattern across the second major surface of the contracted optical-fiber assembly 10 (e.g., the lower surface of the optical-fiber ribbon 1). The bonding material 16 forming the primary bonding-material pattern and the corresponding secondary bonding-material pattern incrementally bonds each adjacent pair of optical fibers in the contracted optical-fiber assembly (e.g., the optical fiber ribbon). As shown in FIGS. 13A and 13B, the optical-fiber ribbon 1 includes recurring adhesive-free gaps 17 in which no bonding material is present across the width w of the contracted optical-fiber assembly for a portion of its longitudinal length.

In related process embodiments, the dispenser 25 and/or the dispensing nozzle 26 (or other dispensing device) revolve in a plane parallel to a planar optical-fiber assembly 10. This has been observed to promote faster line speeds during the manufacturing of a continuously or intermittently bonded optical-fiber ribbon 1, such as an optical-fiber ribbon with a distorted sinusoidal pattern of bonding material. In this regard, an exemplary dispensing nozzle 26 is made of a capillary tube at the center of a metallic sleeve that is revolving in a substantially circular orbit via a servomotor (e.g., using belt-pulley system). Such a configuration reduces undesirable vibrations, which can sometimes be caused by the linear motion of a conventional reciprocating crank shaft as typically used with reciprocating nozzles, and avoids overlapping and/or uneven distribution of bonding material, which can sometimes occur using a conventional reciprocating crank shaft. Indeed, it has been observed that the use of a revolving nozzle helps to achieve linear velocities v between 400 and 700 meters per minute, which is about 4-5 times greater than is possible with a conventional reciprocating-crank-shaft system.

Typically, the linear velocity v of the optical-fiber assembly 10 and the cyclical frequency r of the dispensing nozzle 26 can be controlled to achieve a pitch p (e.g., v/r) of at least about 50 millimeters, such as between 50 millimeters and 400 millimeters (e.g., between about 75 and 300 millimeters, such as 100-200 millimeters or 120-175 millimeters, for a 12-optical-fiber ribbon). In another exemplary embodiment, the linear velocity v of the optical-fiber assembly 10 and the cyclical frequency r of the dispensing nozzle 26 are controlled to achieve a pitch p (e.g., v/r) of between 90 and 110 millimeters, such as about 100 millimeters (e.g., 100 millimeters +/−0.2 millimeter). In this regard, pitch is the length of the recurring pattern of adhesive beads as applied to an optical-fiber assembly (e.g., the repeating length of a distorted sinusoidal pattern of deposited bonding material in the resulting optical-fiber ribbon). See FIG. 10.

Moreover, the ratio of pitch p (e.g., v/r) to the width w of the contracted optical-fiber assembly is typically at least 6 (e.g., at least 8), such as where the pitch p is at least 50 millimeters for a 24-count, optical-fiber assembly having a contracted width w of about 6 millimeters. More typically, the ratio of pitch p to the width w of the contracted optical-fiber assembly is at least about 12 and less than about 150 (e.g., about 15 or 20 or higher, such as between about 25 and 75). In an exemplary embodiment, the ratio of pitch v/r to the width w of the contracted optical-fiber assembly is between about 30 and 40, such as for a 12-count optical-fiber assembly having a width w of about 3 millimeters. Other exemplary optical-fiber ribbons may have a pitch p between about 10 w and 150 w as normalized to the width w of the contracted optical-fiber assembly (e.g., about 30 w-65 w, contracted optical-fiber assembly (e.g., about 30 w-65 w, such as about 35 w-50 w or 40 w-60 w, for an exemplary sinusoidal-like deposition pattern of adhesive).

In an alternative embodiment, the dispensing nozzle 26 revolves around a central axis at a variable speed (i.e., a variable orbital angular velocity) at a cyclical frequency r. In some instances, varying the orbital speed of the dispensing nozzle 26 may reduce the incidence of uneven bonding, such as can occur if the adhesive bead forms an overly cycloid pattern (e.g., if the pitch v/r is relatively short). Revolving the dispensing nozzle 26 at variable orbital angular velocity can enhance the resulting distorted sinusoidal pattern (e.g., by reducing the cycloid-like nature of the adhesive bead) or can create rectilinear adhesive beads between adjacent optical fibers in the finished optical-fiber ribbon. For example, the orbital angular velocity may change when the dispensing nozzle 26 is positioned above an outer edge portion of the expanded optical-fiber assembly 10 to modify the cycloidal transition (e.g., depending on the perspective, the orbital angular velocity could slow to elongate the valleys in the cycloid pattern and/or could increase to shorten the arced peak in the cycloid pattern), or the dispensing nozzle 26 may pause its circular orbit when positioned above gaps in the expanded optical-fiber assembly 10 to form elongated, rectilinear adhesive beads. Similarly, the orbital angular velocity might slow across the central portion of the expanded optical-fiber assembly 10 to create an ovaloid movement, which might achieve a different pattern for the sinusoidal deposition of adhesive. In an alternative embodiment, the circular orbit itself can be elongated (e.g., an elliptical orbit) to facilitate the deposition of an adhesive bead that is more sinusoidal and less cycloidal.

An exemplary method for applying either a continuous bead of bonding material or discontinuous beads of bonding material to an optical-fiber assembly in a way that facilitates faster line speeds during the manufacturing of optical-fiber ribbons is disclosed in commonly assigned U.S. Pat. No. 10,884,213 for an Optical-Fiber Ribbon with Distorted Sinusoidal Adhesive Pattern and Method Therefor, which is hereby incorporated by reference in its entirety.

Figure 14:
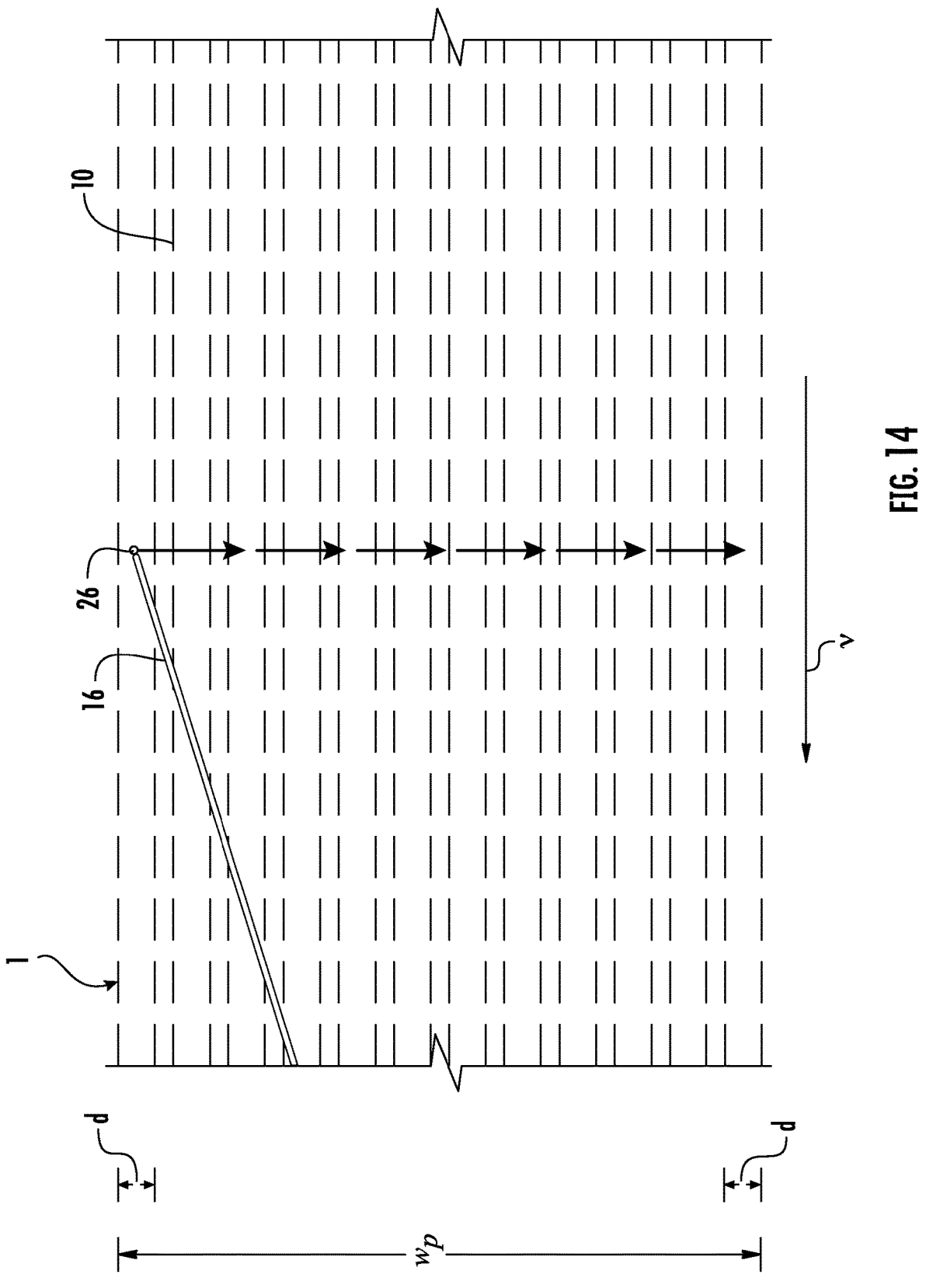
FIG. 14 depicts in a top view a portion of an exemplary process for making an optical-fiber ribbon in accordance with an embodiment of this disclosure.

In an exemplary process embodiment depicted in FIG. 14, the dispensing nozzle 26 linearly reciprocates across the expanded optical-fiber assembly (e.g., moves side-to-side crosswise to the longitudinal length of the optical-fiber assembly) with an amplitude substantially between (i) the lateral distance between the two outermost optical fibers (w$_p$−2d) and (ii) the processing width w$_p$ of the expanded optical-fiber assembly. In this way, the bonding material is applied (e.g., as either continuous or discontinuous adhesive beads) across at least one major surface of the expanded optical-fiber assembly (e.g., its upper surface).

Figure 15:
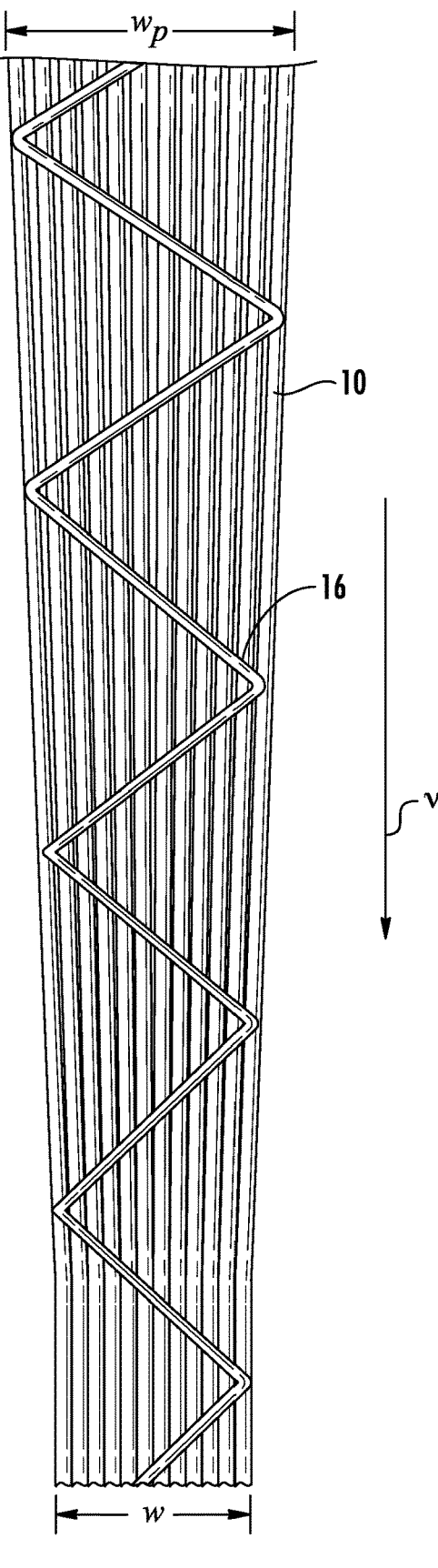
FIG. 15 depicts in a top view the contraction of an exemplary expanded optical-fiber assembly in accordance with an embodiment of this disclosure (e.g., contracted in accordance with the exemplary process depicted in FIG. 14).

After contraction of the expanded optical-fiber assembly, such as illustrated in FIG. 15, and curing of the bonding material, the adhesive material bonding adjacent optical fibers in the resulting optical-fiber ribbon 1 typically forms a more linear adhesive pattern (e.g., a zigzag-like pattern or a sawtooth-like pattern) across the width w of the contracted optical-fiber assembly 10 (and the resulting optical-fiber ribbon 1). As schematically depicted in FIGS. 16A and 16B (or FIGS. 17A and 17B), such linear-like adhesive patterns typically have a width substantially between (i) the lateral distance (w−2d) between the two outermost optical fibers 11a, 11b and (ii) the width w of the contracted optical-fiber assembly 10 (e.g., substantially corresponding to the width of the optical-fiber ribbon 1).

With reference to FIG. 14, in process embodiments in which the dispensing nozzle 26 linearly reciprocates continuously substantially across the processing width w$_p$ of the expanded optical-fiber assembly, such uninterrupted linear reciprocation typically produces substantially continuous adhesive beads (e.g., zigzag-like patterns) between the outermost optical fibers in the optical-fiber assembly. For example, FIGS. 16A and 16B depict opposite sides (e.g., opposite substantially planar surfaces) of an exemplary optical-fiber ribbon 1 in which, for a portion of the contracted optical-fiber assembly's longitudinal length, bonding material (e.g., cured adhesive) forms a primary bonding-material pattern across the contracted optical-fiber assembly's first major surface and a corresponding secondary bonding-material pattern across the contracted optical-fiber assembly's second major surface.

Figure 16A:
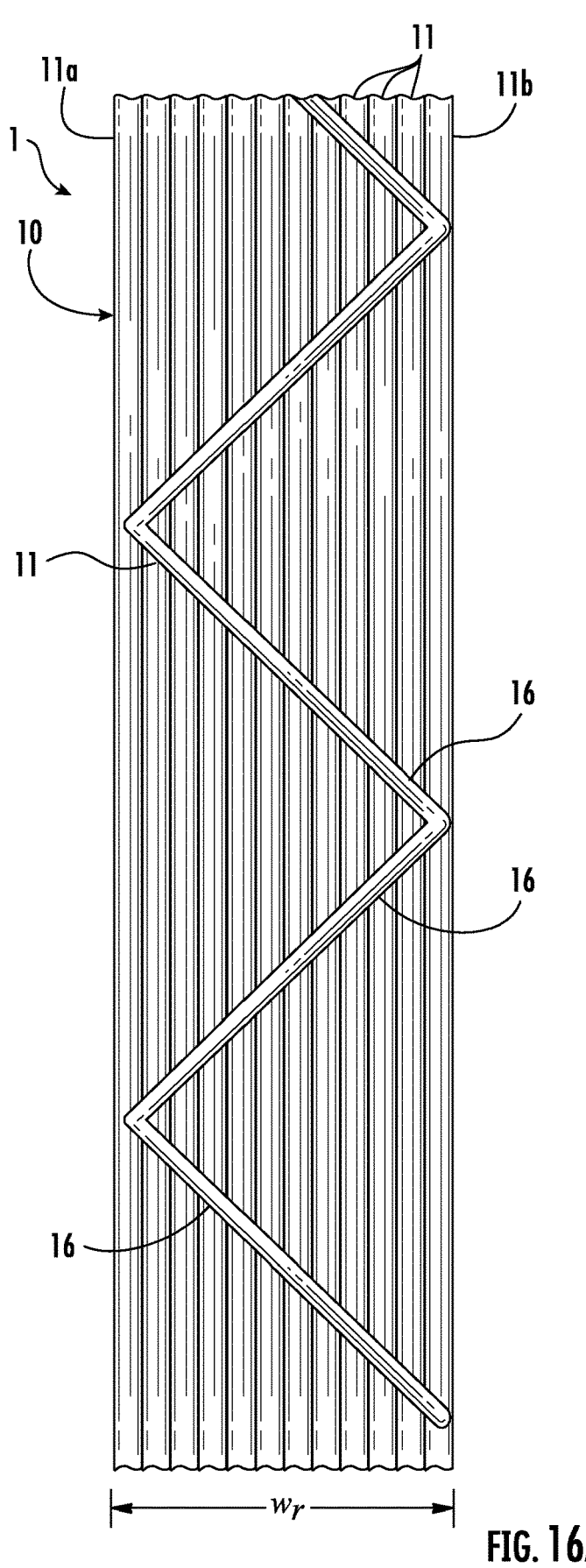
FIGS. 16A and 16B depict in respective views opposite sides of a section of an exemplary optical-fiber ribbon (e.g., made in accordance with the exemplary process depicted in FIG. 14).
Figure 16B:
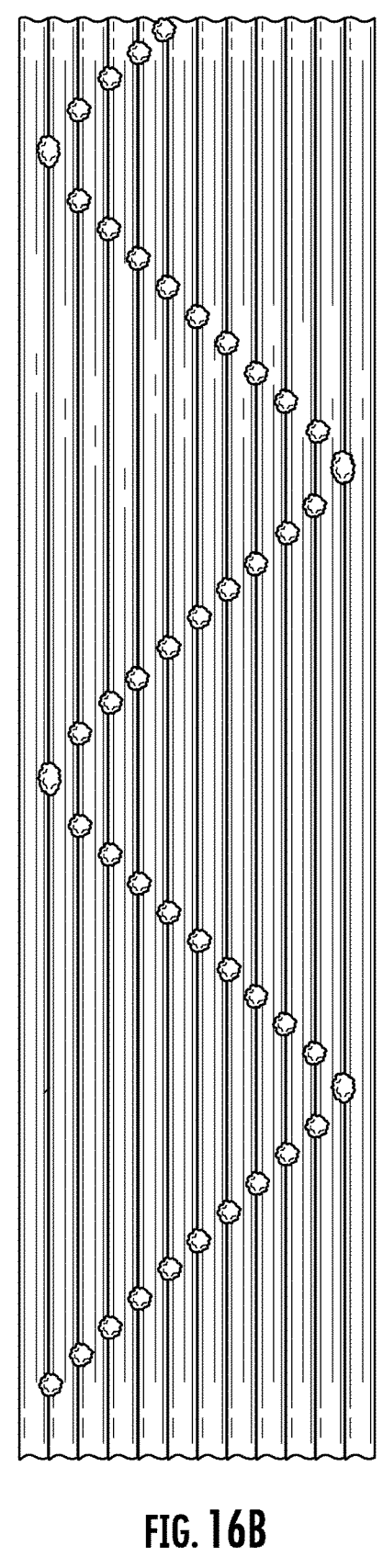

Further to the exemplary process embodiment depicted in FIG. 14, FIG. 16A depicts a substantially continuous adhesive bead in a zigzag-like pattern across the first major surface of the contracted optical-fiber assembly 10 (e.g., the upper surface of the optical-fiber ribbon 1), and FIG. 16B depicts intermittent beads of bonding material in a zigzag-like pattern across the second major surface of the contracted optical-fiber assembly 10 (e.g., the lower surface of the optical-fiber ribbon 1). The bonding material 16 forming the primary bonding-material pattern and the corresponding secondary bonding-material pattern incrementally bonds each adjacent pair of optical fibers in the contracted optical-fiber assembly (e.g., the optical fiber ribbon).

With reference to FIG. 14, in process embodiments in which the dispensing nozzle 26 linearly reciprocates in intermittent steps substantially across the processing width $w_p$ of the expanded optical-fiber, such step-wise reciprocation typically produces rectilinear adhesive beads (e.g., rectilinear adhesive beads deposited in a zigzag-like pattern) between the outermost optical fibers in the optical-fiber assembly. For example, the dispensing nozzle 26 may pause when positioned above gaps in the expanded optical-fiber assembly to deposit bonding material as longitudinal, rectilinear adhesive beads within the respective gaps (e.g., spaces between adjacent optical fibers). FIGS. 17A and 17B depict opposite sides (e.g., opposite substantially planar surfaces) of an exemplary optical-fiber ribbon 1 in which, for a portion of the contracted optical-fiber assembly's longitudinal length, bonding material 16 (e.g., cured adhesive or other matrix resin) forms a primary bonding-material pattern of rectilinear adhesive beads across the contracted optical-fiber assembly's first major surface and a corresponding secondary bonding-material pattern across the contracted optical-fiber assembly's second major surface.

Further to the exemplary process embodiment depicted in FIG. 14, FIG. 17A depicts rectilinear adhesive beads in a zigzag-like pattern across the first major surface of the contracted optical-fiber assembly 10 (e.g., the upper surface of the optical-fiber ribbon), and FIG. 17B depicts intermittent beads of bonding material in a zigzag-like pattern across the second major surface of the contracted optical-fiber assembly 10 (e.g., the lower surface of the optical-fiber ribbon). The bonding material 16 forming the primary bonding-material pattern of rectilinear adhesive beads and the corresponding secondary bonding-material pattern incrementally bonds each adjacent pair of optical fibers in the contracted optical-fiber assembly (e.g., the optical fiber ribbon).

Figure 18:
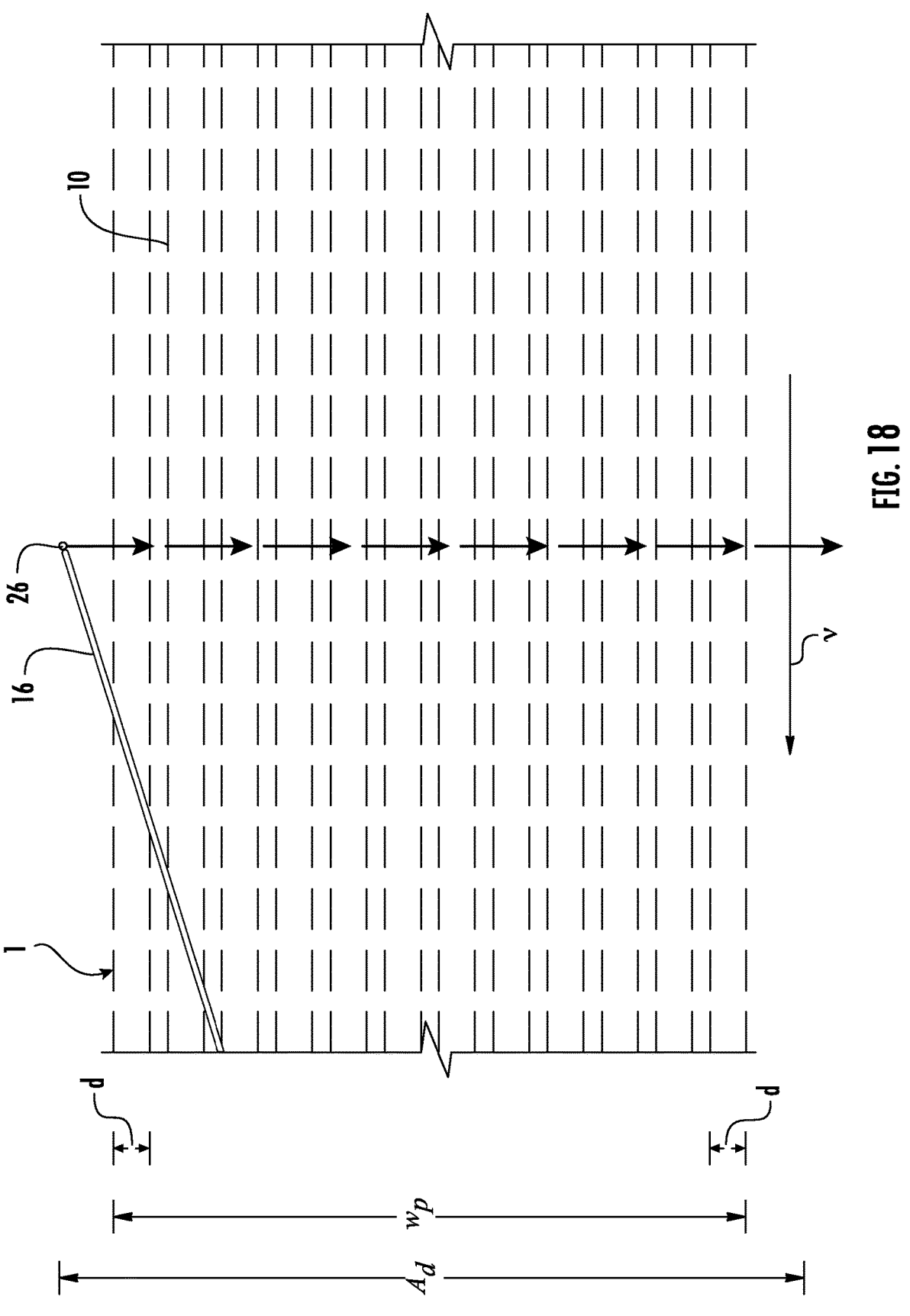
FIG. 18 depicts in a top view a portion of an exemplary process for making an optical-fiber ribbon in accordance with an embodiment of this disclosure.

In an alternative, exemplary process embodiment depicted in FIG. 18, the dispensing nozzle 26 linearly reciprocates across the expanded optical-fiber assembly (e.g., moves side-to-side crosswise to the longitudinal length of the optical-fiber assembly) with an amplitude $A_d$ exceeding the expanded optical-fiber assembly's processing width $w_p$. This kind of "overshooting" reciprocation can yield an optical-fiber ribbon 1, such as schematically depicted in FIGS. 19A and 19B (or FIGS. 20A and 20B), having recurring adhesive-free gaps in which no bonding material is present across the width w of the contracted optical-fiber assembly 10 for a portion of its longitudinal length.

With reference to FIG. 18, in process embodiments in which the dispensing nozzle 26 linearly reciprocates continuously an amplitude $A_d$ across the processing width $w_p$ of the expanded optical-fiber assembly, such uninterrupted linear reciprocation typically produces substantially continuous adhesive beads (e.g., zigzag-like segments) between the outermost optical fibers in the optical-fiber assembly. For example, FIGS. 19A and 19B depict opposite sides (e.g., opposite substantially planar surfaces) of an exemplary optical-fiber ribbon 1 in which, for a portion of the contracted optical-fiber assembly's longitudinal length, bonding material (e.g., cured adhesive or other matrix resin) forms a primary bonding-material pattern across the contracted optical-fiber assembly's first major surface and a corresponding secondary bonding-material pattern across the contracted optical-fiber assembly's second major surface.

Figures 19A, 19B:
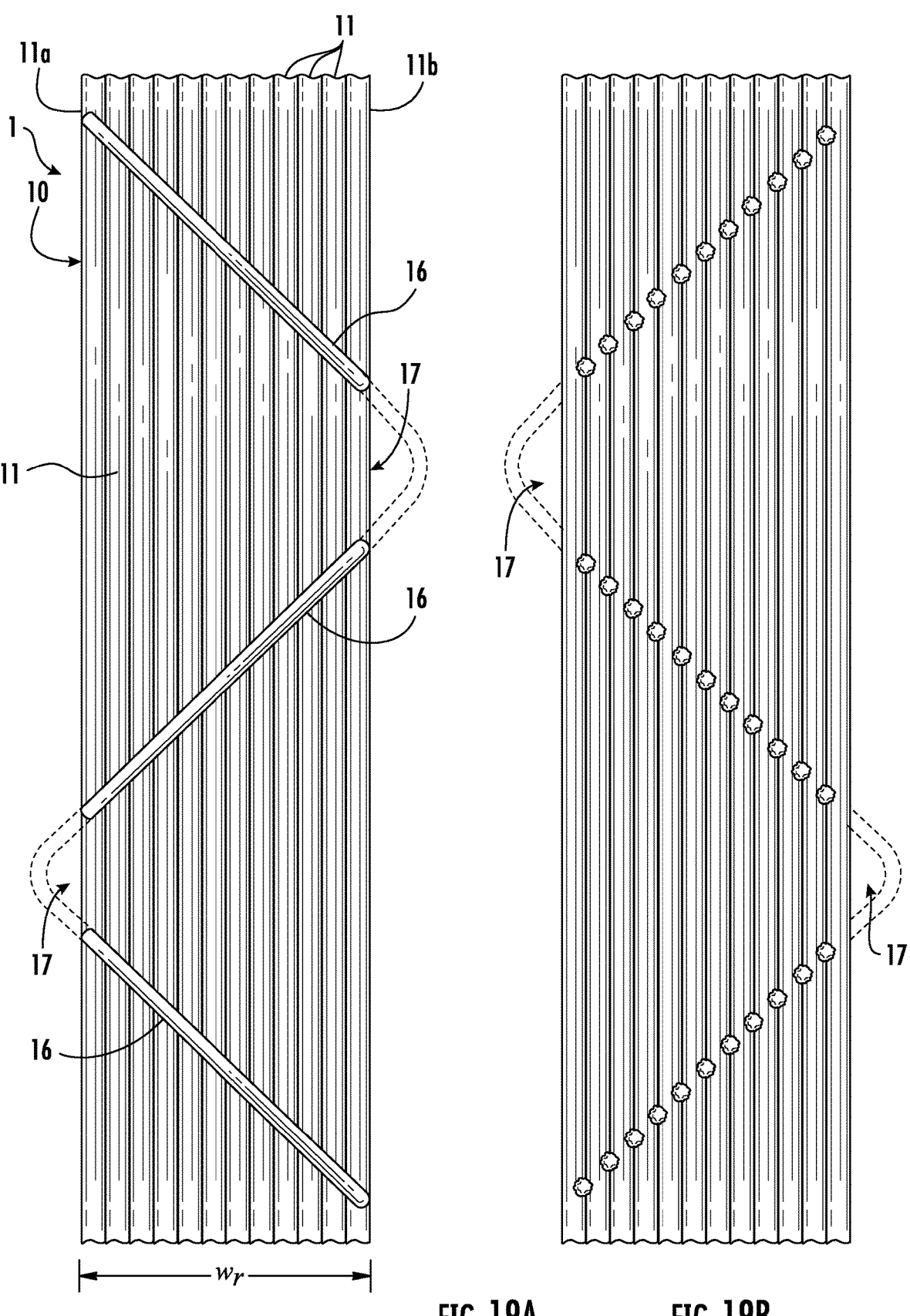
FIGS. 19A and 19B depict in respective views opposite sides of a section of an exemplary optical-fiber ribbon (e.g., made in accordance with the exemplary process depicted in FIG. 18).

Further to the exemplary process embodiment depicted in FIG. 18, FIG. 19A depicts incrementally continuous adhesive beads in a zigzag-like pattern (e.g., linear adhesive segments) across the first major surface of the contracted optical-fiber assembly 10 (e.g., the upper surface of the optical-fiber ribbon 1), and FIG. 19B depicts intermittent beads of bonding material in a zigzag-like pattern across the second major surface of the contracted optical-fiber assembly 10 (e.g., the lower surface of the optical-fiber ribbon 1). The bonding material 16 forming the primary bonding-material pattern and the corresponding secondary bonding-material pattern incrementally bonds each adjacent pair of optical fibers in the contracted optical-fiber assembly (e.g., the optical fiber ribbon). As shown in FIGS. 19A and 19B, the optical-fiber ribbon 1 includes recurring adhesive-free gaps 17 in which no bonding material is present across the width w of the contracted optical-fiber assembly for a portion of its longitudinal length.

Figure 20B:
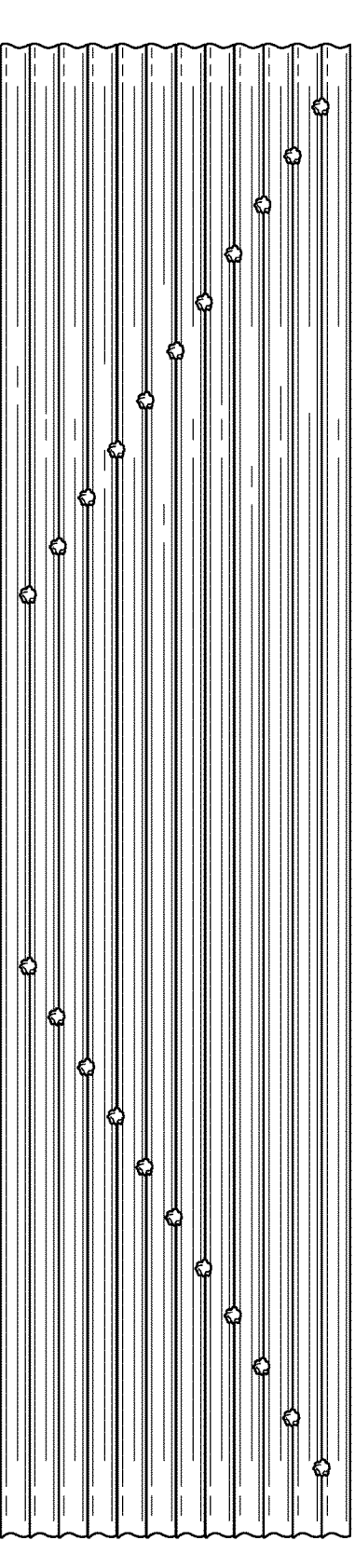

With reference to FIG. 18, in process embodiments in which the dispensing nozzle 26 linearly reciprocates an amplitude $A_d$ in intermittent steps across the processing width $w_p$ of the expanded optical-fiber assembly, such incremental linear reciprocation typically produces rectilinear adhesive beads (e.g., rectilinear adhesive beads deposited in a zigzag-like pattern) between the outermost optical fibers in the optical-fiber assembly. For example, the dispensing nozzle 26 may pause when positioned above gaps in the expanded optical-fiber assembly to deposit bonding material as longitudinal, rectilinear adhesive beads within the respective gaps (e.g., spaces between adjacent optical fibers). FIGS. 20A and 20B depict opposite sides (e.g., opposite substantially planar surfaces) of an exemplary optical-fiber ribbon 1 in which, for a portion of the contracted optical-fiber assembly's longitudinal length, bonding material (e.g., cured adhesive or other matrix resin) forms a primary bonding-material pattern of rectilinear adhesive beads across the contracted optical-fiber assembly's first major surface and a corresponding secondary bonding-material pattern across the contracted optical-fiber assembly's second major surface.

Further to the exemplary process embodiment depicted in FIG. 18, FIG. 20A depicts rectilinear adhesive beads in a zigzag-like pattern across the first major surface of the contracted optical-fiber assembly 10 (e.g., the upper surface of the optical-fiber ribbon 1), and FIG. 20B depicts intermittent beads of bonding material in a zigzag-like pattern across the second major surface of the contracted optical-fiber assembly 10 (e.g., the lower surface of the optical-fiber ribbon 1). The bonding material 16 forming the primary bonding-material pattern of rectilinear adhesive beads and the corresponding secondary bonding-material pattern incrementally bonds each adjacent pair of optical fibers in the contracted optical-fiber assembly (e.g., the optical fiber ribbon). As shown in FIGS. 20A and 20B, the optical-fiber ribbon 1 includes recurring adhesive-free gaps 17 in which no bonding material is present across the width w of the contracted optical-fiber assembly for a portion of its longitudinal length.

As discussed, in exemplary optical-fiber ribbons according to the present invention, bonding material adhesively bonds adjacent optical fibers in an optical-fiber assembly. Two such optical-fiber ribbons may be aligned and joined using a mass-fusion splicing machine. For example, corresponding 12-fiber optical-fiber ribbons may be positioned in respective 12-fiber alignment chucks and, after heat stripping, cleaning, and cleaving, the two optical-fiber ribbons may be spliced at once (e.g., the corresponding optical fibers can be simultaneously butt-spliced end-to-end in the mass-fusion splicing machine).

The optical-fiber ribbon according to the present invention may be used to form optical-fiber-cable units and optical-fiber cables. An exemplary optical-fiber-cable unit has 24 ribbons of twelve optical fibers each. Such an optical-fiber-cable unit packs 288 optical fibers into a high optical-fiber density. Accordingly, in another inventive aspect, the present invention embraces an optical-fiber-cable unit including one or more optical-fiber ribbons (also according to the present invention) surrounded by a polymeric sheath. The present invention further embraces an optical-fiber cable including one or more of the optical-fiber ribbons or optical-fiber-cable units according to the present invention.

To supplement the present disclosure, this application incorporates entirely by reference the following commonly assigned patents, patent application publications, and patent applications: U.S. Pat. No. 7,623,747 for a Single Mode Optical Fiber; U.S. Pat. No. 7,889,960 for a Bend-Insensitive Single-Mode Optical Fiber; U.S. Pat. No. 8,145,025 for a Single-Mode Optical Fiber Having Reduced Bending Losses; U.S. Pat. No. 8,265,442 for a Microbend-Resistant Optical Fiber; U.S. Pat. No. 8,600,206 for a Reduced-Diameter Optical Fiber; U.S. Pat. No. 10,185,105 for a Flexible Optical-Fiber Ribbon; U.S. Pat. No. 10,782,495 for a Flexible Optical-Fiber Ribbon; U.S. Pat. No. 10,884,213 for an Optical-Fiber Ribbon with Distorted Sinusoidal Adhesive Pattern and Method Therefor; U.S. Pat. No. 10,983,297 for an Optical Fiber Ribbon and a Method of Producing the Same; U.S. Pat. No. 11,169,342 for a Flexible Optical-Fiber Ribbon; U.S. Pat. No. 11,256,051 for a Flexible Optical-Fiber Ribbon; U.S. Pat. No. 11,500,171 for an Optical Fiber Ribbon and a Method and System of Producing the Same; U.S. Pat. No. 11,442,238 for an Optical-Fiber Ribbon with Spaced Optical-Fiber Units; U.S. Pat. No. 11,460,652 for an Optical-Fiber Ribbon with Adhesive-Free Gaps; and U.S. Pat. No. 11,656,417 for a Flexible Optical-Fiber Ribbon.

Other variations of the disclosed embodiments can be understood and effected by those of ordinary skill in the art in practicing the present invention by studying the drawings, the disclosure, and the appended claims. In the claims, the word "comprising" does not exclude other elements or steps, and the indefinite article "a" or "an" does not exclude a plurality. Unless otherwise specified, numerical ranges are intended to include the endpoints.

It is within the scope of this disclosure for one or more of the terms "substantially," "about," "approximately," and/or the like, to qualify each adjective and adverb of the foregoing disclosure, to provide a broad disclosure. As an example, it is believed those of ordinary skill in the art will readily understand that, in different implementations of the features of this disclosure, reasonably different engineering tolerances, precision, and/or accuracy may be applicable and suitable for obtaining the desired result. Accordingly, it is believed those of ordinary skill will readily understand usage herein of the terms such as "substantially," "about," "approximately," and the like.

The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

While various aspects, features, and embodiments have been disclosed herein, other aspects, features, and embodiments will be apparent to those having ordinary skill in the art. The various disclosed aspects, features, and embodiments are for purposes of illustration and are not intended to be limiting. It is intended that the scope of the present invention includes at least the following claims and their equivalents:

The invention claimed is:

1. A method of making an optical-fiber ribbon, comprising:
   (i) arranging a plurality n of optical fibers into an expanded longitudinal optical-fiber assembly having processing width $w_p$ extending crosswise to a longitudinal length of the expanded optical-fiber assembly, each of the n optical fibers having a nominal diameter d, wherein the plurality of optical fibers are substantially parallel and wherein at least some of the plurality of optical fibers are respectively spaced apart from one another to define respective gaps between at least some adjacent optical fibers, the respective gaps configured to facilitate movement of bonding material between at least some adjacent optical fibers;
   (ii) advancing the expanded optical-fiber assembly at linear velocity v;
   (iii) applying bonding material to a surface of the expanded optical-fiber assembly via a dispenser; and
   (iv) thereafter closing the respective gaps between the respective optical fibers in the expanded optical-fiber assembly to achieve a contracted optical-fiber assembly having planar width w extending crosswise to a longitudinal length of the contracted optical-fiber assembly, wherein, along a longitudinal portion of the contracted optical-fiber assembly, the planar width w of the contracted optical-fiber assembly reflects the number n and diameter d of the optical fibers in the contracted optical-fiber assembly, whereby planar width $w \approx n \times d$ and whereby processing width $w_p >$ planar width w.

2. The method according to claim 1, wherein at least 25 percent of the optical fibers in the expanded optical-fiber assembly are spaced apart from at least one adjacent optical fiber.

3. The method according to claim 1, wherein at least 50 percent of the optical fibers in the expanded optical-fiber assembly are spaced apart from at least one adjacent optical fiber.

4. The method according to claim 1, comprising continuously applying bonding material to a surface of the expanded optical-fiber assembly via the dispenser while the dispenser revolves around a central axis that is centrally positioned to substantially intersect the expanded optical-fiber assembly's midline ($w_p/2$), wherein the dispenser applies bonding material to each optical fiber in the expanded optical-fiber assembly.

5. The method according to claim 4, wherein the expanded optical-fiber assembly includes two outermost optical fibers having diameter d, and wherein the dispenser revolves around the central axis in a circular orbit having a diameter inclusively between (i) the lateral distance between the two outermost optical fibers ($w_p-2d$) and (ii) the processing width $w_p$ of the expanded optical-fiber assembly.

6. The method according to claim 1, comprising applying bonding material to each optical fiber in the expanded optical-fiber assembly via the dispenser, wherein the expanded optical-fiber assembly includes two outermost optical fibers having diameter d, and wherein the dispenser repeatedly moves across the expanded optical-fiber assembly inclusively between (i) the lateral distance between the two outermost optical fibers ($w_p-2d$) and (ii) the processing width $w_p$ of the expanded optical-fiber assembly.

7. The method according to claim 1, wherein the dispenser repeatedly moves an amplitude $A_d$ measured crosswise to the longitudinal length of the expanded optical-fiber assembly, wherein the dispenser's amplitude $A_d$ exceeds the expanded optical-fiber assembly's processing width $w_p$, whereby amplitude $A_d$>processing width $w_p$.

8. The method according to claim 7, wherein the dispenser repeatedly moves across the processing width $w_p$ of the expanded optical-fiber assembly beyond both a first outermost optical fiber in the expanded optical-fiber assembly and an opposite second outermost optical fiber in the expanded optical-fiber assembly to apply bonding material to each optical fiber in the expanded optical-fiber assembly.

9. The method according to claim 7, wherein the dispenser reciprocates at amplitude $A_d$ across the expanded optical-fiber assembly's processing width $w_p$.

10. The method according to claim 7, wherein the dispenser revolves around a central axis at a cyclical frequency r.

11. A method of making an optical-fiber ribbon, comprising:

(i) arranging a plurality n of optical fibers into an expanded longitudinal optical-fiber assembly having processing width $w_p$, a first major surface, and a second major surface, wherein each of the n optical fibers has a nominal diameter d, and wherein the plurality of optical fibers are substantially parallel and respectively spaced apart from one another to define respective gaps between adjacent optical fibers sufficient to pass bonding material therethrough;

(ii) continuously advancing the plurality of spaced optical fibers as arranged in the expanded optical-fiber assembly at linear velocity v;

(iii) applying bonding material to the first major surface of the expanded optical-fiber assembly via a dispensing nozzle;

(iv) passing at least some bonding material from the expanded optical-fiber assembly's first major surface toward the expanded optical-fiber assembly's second major surface, the bonding material passing between and through the respective gaps between adjacent, spaced optical fibers; and (v) closing the respective gaps between adjacent, spaced optical fibers in the expanded optical-fiber assembly to achieve a contracted optical-fiber assembly having planar width w, wherein, along a longitudinal portion of the contracted optical-fiber assembly, the planar width w of the contracted optical-fiber assembly reflects the number n and diameter d of the optical fibers in the contracted optical-fiber assembly, whereby planar width w≈n×d and whereby processing width $w_p$>planar width w.

12. The method according to claim 11, wherein the bonding material on the contracted optical-fiber assembly's first and second major surfaces adhesively bonds adjacent optical fibers in the contracted optical-fiber assembly.

13. The method according to claim 11, comprising continuously applying bonding material to the first major surface of the expanded optical-fiber assembly via the dispensing nozzle while the dispensing nozzle revolves around a central axis that is centrally positioned to substantially intersect the expanded optical-fiber assembly's midline ($w_p/2$), wherein:

the expanded optical-fiber assembly includes two outermost optical fibers having diameter d, and wherein the dispensing nozzle revolves around the central axis in a circular orbit having a diameter inclusively between (i) the lateral distance between the two outermost optical fibers ($w_p-2d$) and (ii) the processing width $w_p$ of the expanded optical-fiber assembly; and the dispensing nozzle applies bonding material to each optical fiber in the expanded optical-fiber assembly.

14. The method according to claim 11, comprising applying bonding material to each optical fiber in the expanded optical-fiber assembly via the dispensing nozzle, wherein:

the expanded optical-fiber assembly includes two outermost optical fibers having diameter d, and wherein the dispensing nozzle repeatedly moves across the expanded optical-fiber assembly inclusively between (i) the lateral distance between the two outermost optical fibers ($w_p-2d$) and (ii) the processing width $w_p$ of the expanded optical-fiber assembly.

15. The method according to claim 11, wherein the dispensing nozzle repeatedly moves an amplitude $A_d$ across the expanded optical-fiber assembly's processing width $w_p$, wherein the dispensing nozzle's amplitude $A_d$ measured crosswise to the longitudinal length of the expanded optical-fiber assembly exceeds the expanded optical-fiber assembly's processing width $w_p$, whereby amplitude $A_d$>processing width $w_p$.

16. The method according to claim 11, wherein the dispensing nozzle repeatedly moves across the processing width $w_p$ of the expanded optical-fiber assembly beyond both a first outermost optical fiber in the expanded optical-fiber assembly and an opposite second outermost optical fiber in the expanded optical-fiber assembly to apply bonding material to each optical fiber in the expanded optical-fiber assembly.

17. An optical-fiber ribbon, comprising:

(i) a plurality n of respectively adjacent optical fibers extending in a longitudinal direction and arranged in parallel to form an optical-fiber assembly having a first major surface, a second major surface, and a width w extending crosswise to a longitudinal length of the optical-fiber assembly; and (ii) bonding material adhesively bonding adjacent optical fibers in the optical-fiber assembly, wherein, for a portion of the optical-fiber assembly's longitudinal length, the bonding material forms a primary bonding-material pattern across the optical-fiber assembly's first major surface and a corresponding secondary bonding-material pattern across the optical-fiber assembly's second major surface, wherein the bonding material forming the primary bonding-material pattern and the corresponding secondary bonding-material pattern incrementally bonds each adjacent pair of optical fibers in the optical-fiber assembly;

wherein each of the n optical fibers in the optical-fiber assembly has a nominal diameter d, and, along a longitudinal portion of the optical-fiber assembly, the nominal width $w_r$ of the optical-fiber ribbon reflects the number n and diameter d of the optical fibers in the optical-fiber assembly, whereby $w_r \approx n \times d$.

18. The optical-fiber ribbon according to claim 17, wherein, along a longitudinal portion of the optical-fiber assembly, the primary bonding-material pattern comprises a continuous bead of bonding material.

19. The optical-fiber ribbon according to claim 18, wherein, along a longitudinal portion of the optical-fiber assembly, the secondary bonding-material pattern respectively comprises intermittent beads of bonding material.

20. The optical-fiber ribbon according to claim 17, wherein, along a longitudinal portion of the optical-fiber assembly, the primary bonding-material pattern comprises intermittent beads of bonding material.

21. The optical-fiber ribbon according to claim 17, wherein the optical-fiber assembly includes two outermost optical fibers having diameter d, and wherein, along a longitudinal portion of the optical-fiber assembly, the primary bonding-material pattern across the optical-fiber assembly's first major surface has an amplitude substantially between (i) the lateral distance between the two outermost optical fibers (w−2d) and (ii) the width w of the optical-fiber assembly.

22. An optical-fiber cable comprising one or more optical-fiber ribbons according to claim 17.

\* \* \* \* \*